United States Patent
Gaddy et al.

(10) Patent No.: US 8,836,716 B1
(45) Date of Patent: Sep. 16, 2014

(54) SYSTEM AND METHOD FOR REDUCING VISIBLE ARTIFACTS IN THE DISPLAY OF COMPRESSED AND DECOMPRESSED DIGITAL IMAGES AND VIDEO

(71) Applicant: Spinella IP Holdings, Inc., Colts Neck, NJ (US)

(72) Inventors: William L. Gaddy, Milford, PA (US); Vidhya Seran, Irving, TX (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 0 days.

(21) Appl. No.: 14/032,640

(22) Filed: Sep. 20, 2013

(51) Int. Cl.
*G09G 5/02* (2006.01)

(52) U.S. Cl.
CPC ................................ *H04N 6/646* (2013.01)
USPC ........................ 345/591; 345/603; 345/604

(58) Field of Classification Search
CPC .................................................. G09G 2340/06
USPC ........................................... 345/591, 600–605
See application file for complete search history.

(56) References Cited

U.S. PATENT DOCUMENTS

| | | | |
|---|---|---|---|
| 6,570,612 B1 * | 5/2003 | Saund et al. | 348/218.1 |
| 2003/0053088 A1 * | 3/2003 | Kanai et al. | 358/1.9 |
| 2004/0119843 A1 * | 6/2004 | Hoshuyama | 348/222.1 |
| 2004/0218811 A1 | 11/2004 | Edge et al. | |
| 2007/0009167 A1 | 1/2007 | Dance et al. | |
| 2008/0049275 A1 * | 2/2008 | Hsu et al. | 358/520 |
| 2010/0201886 A1 | 8/2010 | Hinkel et al. | |
| 2010/0245857 A1 | 9/2010 | Plummer | |
| 2011/0267646 A1 * | 11/2011 | Shinohara | 358/1.15 |
| 2012/0127364 A1 | 5/2012 | Bratt et al. | |
| 2013/0141740 A1 | 6/2013 | Shimbaru | |

OTHER PUBLICATIONS

International Search Report of PCT Application No. PCT/US2013/060942 dated Apr. 21, 2014, 2 pages.

* cited by examiner

*Primary Examiner* — Aaron M Richer
(74) *Attorney, Agent, or Firm* — Lowenstein Sandler LLP

(57) ABSTRACT

An encoding method and system are disclosed. A processing device receives an image buffer. The processing device converts one or more pixels of the image buffer from a native color space to one or more perceptually uniform color spaces. The processing device multiplies a lightness channel of the one or more pixels by a first value. The processing device multiplies one or more color channels of the one or more pixels by a second value. The processing device converts the image buffer from the one or more perceptually uniform color spaces to the native color space. The processing device transmits the image buffer to a downstream device.

22 Claims, 16 Drawing Sheets

SYSTEM AND METHOD FOR REDUCING VISIBLE ARTIFACTS IN THE DISPLAY OF COMPRESSED AND DECOMPRESSED DIGITAL IMAGES AND VIDEO

TECHNICAL FIELD

Embodiments of the present disclosure relate to image processing, and, more particularly, to improving perceptual quality and/or efficiency of existing image and video compression methods.

BACKGROUND

Achieving good image and video compression efficiency requires choosing a symbolic representation of image color and brightness that closely approximates the differential sensitivity of the human visual system (hereinafter, HVS); otherwise, coding rate is wasted as described in Joan L. Mitchell, et. al., "*MPEG Video Compression Standard*," Chapman & Hall, Ltd., London, UK, 1996, incorporated herein by reference. Since perceptual mechanisms of the HVS are complex and non-linear, design of color systems and color spaces for video and image compression, transmission, and display incur a tradeoff of accuracy and precision versus system complexity and practical implementation.

The International Commission on Illumination (usually abbreviated as CIE for Commission internationale de l'éclairage) color space (hereinafter "CIE1931 XYZ") represents the first attempt (i.e., 1931 refers to the year of publication) to produce a color space based on coarse measurements of human color perception. CIE 1931 XYZ is used in JPEG2000-based codec systems such as those used by Digital Cinema Package as specified in "Digital Cinema System Specification Version 1.2 with Errata," DCI, LLC, 10 Oct. 2012, but is not otherwise widely used in video transmission systems because of its complexity and the need for a standard illuminant and tristimulus value to be provided by a system implementer (or an end-user). Despite its good approximation to the HVS's color perception sensitivity, CIE1931 XYZ is far from a perfect representation of the HVS's sensitivity to color differences—even with a required tristimulus value and illuminant value being held constant—knowledge gained as a result of research into, and careful measurements of the HVS and its perceptual sensitivities as described in International Color Consortium, "*Specification ICC.*1:2004-10 *(Profile version* 4.2.0.0) *Image technology colour management—Architecture, profile format, and data structure*," (2006), incorporated herein by reference.

After CIE1931 XYZ, and with the later advent and standardization of color television, the luma (Y), in-phase (I), quadrature (Q) color space (hereinafter "YIQ color space") was developed in 1953 primarily as a way to encode color signals in a severely band-limited transmission and reception regime. While YIQ is certainly a better approximation of the perceptual tendencies of human visual perceptual characteristics than the RGB color space representation required by RGB phosphor cathode-ray-tube color televisions at the time of their invention and widespread usage, the YIQ color space is by no means ideal. YIQ color space was primarily conceived for practical implementation purposes for the cost-effective analog radio-frequency components available contemporaneously and for maintaining backwards compatibility with existing "black-and-white" television transmission standards.

The YCbCr and Y'CbCr color spaces are derivations of the YIQ color space for purposes of very effective, but yet still very coarse approximations of human visual perceptual color processing and perceptual uniformity. While practical when these color spaces were designed in the early 1980's, designs employing the YCbCr and the Y'CbCr color spaces were limited to simple digital circuits and systems with very limited processing capability and digital memory transfer bandwidth. The YCbCr and the Y'CbCr color space representations form the basis of early and current video compression codec systems that employ the JPEG and MPEG standards of compression. Despite their practicality, the YCbCr and the Y'CbCr color space representations are inefficient because they allocate significant luminance and color depth symbol-rate or bit-rate to perceptually insignificant color differences.

More recently, color spaces and perceptual-difference frameworks that represent a more faithful approximation of HSV perceptual uniformity have been published, such as the CIELAB standard described in "ISO 11664-4:2008(E)/CIE S 014-4/E:2007: Joint ISO/CIE Standard: Colorimetry—Part 4: CIE 1976 L*a*b* Colour Space" (hereinafter, CIELAB). CIELAB accounts for perceptual sensitivities in the lightness and color dimensions, and CIECAM02, described in "CIE 159:2004: A Colour Appearance Model for Colour Management Systems: CIECAM02" (hereinafter, CIECAM02)—which incorporates the aforementioned CIELAB dimensions along with the well-known spatial center-surround retinex effect as observed in E. H. Land, "The retinex theory of color vision.," *Scientific American,* 1977.

Even these advanced efforts at defining a perceptually uniform color space suffer from specific observed anomalies. One example is known as the "blue-purple hue constancy" problem, where blue hue colors do not follow a perfectly linear path as lightness traverses the color space from dark to light, as illustrated in detail in Moroney, "Assessing hue constancy using gradients", Color Imaging: Device-Independent Color, Color Hardcopy, and Graphic Arts V, Reiner Eschbach, Gabriel G. Marcu, Editors, Proceedings of the SPIE Vol. 3963, pp. 294-300 (2000)., incorporated herein by reference. Further, more specific hue-constancy anomalies of CIELAB and its related color spaces have been carefully measured and mapped as taught in Braun et. al., 1998, "Color Gamut Mapping in a Hue-Linearized CIELAB Color Space", *IS&T/SID $6^{th}$Color Imaging Conference*, pp. 163-168, and are more widespread than just the blue-purple constancy problem. Specifically, a generally observed form of this problem is known as the Bezold-Brücke shift: apparent hue can change with luminance (and vice-versa), and this effect has frustrated efforts to find perceptually efficient color representations for video and image transmission, among other applications.

Many attempts at extending or modifying the CIELAB and related color space representations exist, such as Takamura and Kobayashi, 2002, "Practical extension to CIELUV color space to improve uniformity", IEE ICIP 002, which teaches alternate conversion matrix coefficients over CIELUV to improve perceptual linearity, and Behrens, "Deficiencies of the CIE-L*a*b* color space and introduction of the SRLAB2 color model", at "www.magnetkern.de/srlab2.tex" (hereinafter, SRLAB2, incorporated herein by reference). SRLAB2 proposes a whole new color space representation using the chromatic adaptation model of CIECAM02, but which trades off blue-purple (hue) constancy for a reduction in hue angle uniformity and hue-lightness interval lengths uniformity, especially in the skin-tones region of the color space.

Apparently, there exists no perfectly perceptually uniform color space that exhibits all of the characteristics of luminance or lightness uniformity, hue constancy, hue angle uniformity, and hue-lightness interval lengths uniformity, all of which are necessary for an ideal color space representation for video and image coding and transmission.

Since the time of inception of the YCbCr and Y'CbCr color spaces, primarily for simplicity and practicality of implementation, and later for backwards compatibility reasons, most of the video encoder systems today remain standardized upon utilizing the YCbCr color spaces, and not the recent, more complex, but more perceptually uniform color spaces and perceptual-difference-based color representations.

The inefficiency of using YCbCr as a color space basis for video compression extends beyond realizations of color symbol representation, but also luminance as well. For example, CIELAB introduces a non-linear, non-exponential perceptual curve for lightness perception as well, not just color—and in most image and video encoding and display systems, this is not accounted for other than by a simplistic exponential Gamma function. Actual observer measurements have demonstrated that a simple exponential or logarithmic relationship is not adequate to represent perceptual differences of luminance, especially in the low areas of the luminance range, as taught in CIELAB.

Yet, even the most current video and image encoding systems such as the proposed HEVC video encoding standard at the time of this disclosure continue to utilize YCbCr as a color space basis, despite disadvantages including reduced reconstruction quality and wasted coding-rate.

The deficiencies of the selections of color space basis and symbol representation of current video encoding systems is well known in the art, and there have been several attempts to rectify or at least mitigate the negative impact of these codec inefficiencies. Early attempts to use perceptually uniform color space representations as a basis for image and video compression such as those taught in Moroney and Fairchild, "Color space selection for JPEG image compression" Journal of Electronic Imaging 4(4), 373-381 (October 1995) and Drukarev, "Compression-related properties of color spaces", SPIE Vol. 3024, were frustrated by either the complexity of their application for real-time encoding and decoding, or they exhibited comparatively little benefit. Further, the CIE1931 XYZ color space extensively utilized in the related art is recognized to be a better approximation of the human visual system sensitivity to color differences when compared against RGB, YIQ, or YCbCr, but is also highly non-uniform by as much of a ratio as 80:1, as discussed in Poynton, Charles, "*A Technical Introduction to Digital Video.*," John Wiley & Sons, 1996, and the accompanying "*Frequently Asked Questions about Colour*" at "www.poynton.com/ColorFAQ.html", (hereinafter, Poynton) both of which are incorporated herein by reference. With CIELAB, this ratio improves to approximately 6:1, but as Poynton points out, CIELAB conversion is very computationally expensive for video and was not suitable for real-time processing at the time of his writing. Uniformity is a key concept for realizing the most efficient coding, and even CIELAB is far from being an ideal perceptually uniform color space, as shown in the prior art.

Other methods, such as those described in U.S. Patent Application Publication No. US 2012/0314943 A1 (hereinafter, "Guerrero"), attempt to achieve a solution by employing either: (1) a quantization factor applied in a color space optimized for a model of a human visual system, which decreases color space entropy and redundancy or (2) a color table lookup step to decrease color space entropy and redundancy but which increases the memory transfer bandwidth requirements of the system because of the need for a table lookup for each pixel at the pre-encoding stage. Both of these methods are effective at marginally reducing color space entropy provided that a suitable HVS model and perceptually uniform color space is utilized—Guerrero utilizes CIE1931 XYZ which is not a perceptually uniform color space, and while casual mention of CIELAB is made, neither is CIELAB an ideal color space for this purpose for the aforementioned reasons. Most importantly, the method disclosed by Guerrero reduces color entropy at the expense of increasing spatial entropy, negating most of the benefits of implementation with standard DCT-based encoders such as JPEG and MPEG. It would be possible to reduce both spatial and color space entropy and redundancy by combining the disclosed quantization factor or color table lookup along with a histogram compression function, but this would require post-processing on the decoder end to expand the histogram, and further would require in-band or out-of-band communication to coordinate the parameters of such histogram companding. Guerrero does not disclose these concepts, and in fact teaches away from them. Further, performing histogram computations at real-time throughput rates on high-definition, 4K, 5K and 8K resolution video in real-time on mass-market computer systems or end-user devices is exceptionally challenging, as taught in U.S. Pat. No. 8,451,384.

The aforementioned in-band or out-of-band communication methods to coordinate pre-filtering and post-filtering of an encoder and decoder, respectively, are well-known in the art, as described in U.S. Pat. No. 6,195,394 (hereinafter the '394 patent). Although the pre-filtering and post-filtering processes described in the '394 patent are directed to the reduction and subsequent restoration of spatial bandwidth, and not reduction and restoration of perceptual color bandwidth, the '394 patent demonstrates that an out-of-band communications method for signaling the presence of, and the configuration of, pre-filtering and post-filtering operations is needed to ensure proper reconstruction of images and video in proximity of the decoder.

What is needed, but has not been provided, is a high-throughput system and method that improves the perceptual quality and/or the transmission or storage efficiency of existing image and video compression or transmission systems and methods that does not impose an excessive burden of processing complexity or memory transfer bandwidth requirements upon either an encoder or decoder device or system. The system and method would impose no requirement to replace the encoder or decoder. The system and method would synchronize pre-filtering of the encoder and post-filtering of the decoder to signal the presence and configuration of the system and method.

BRIEF SUMMARY OF THE INVENTION

The above-described problems are addressed and a technical solution is achieved in the art by providing an encoding method and system. A processing device receives an image buffer. The processing device converts one or more pixels of the image buffer from a native color space to one or more perceptually uniform color spaces. The processing device multiplies a lightness channel of the one or more pixels of the image buffer by a first value. The processing device multiplies one or more pixels of one or more color channels by a second value. The processing device converts the one or more pixels of the image buffer from the one or more perceptually uniform color spaces to the native color space. The processing device transmits the image buffer to a downstream device.

The perceptually uniform color spaces are color spaces wherein two colors of equal Cartesian distance in the color spaces are substantially equally distant perceptually with respect to the human visual system.

In an example, the first value may be a constant value and the second value may be a constant value. In an example, the processing device may transmit the first value and the second value to the second processing device. The processing device may receive the first value and the second value from one of an upstream device or a memory buffer. The processing device may transmit the converted image buffer to an encoder, wherein the encoder encodes the image buffer before a transmitter transmits the encoded image buffer to the downstream device.

In an example, the processing device may receive one or more whitepoint values. The processing device may convert the pixels of the image buffer from the native color space to the one or more perceptually uniform color spaces based on the one or more whitepoint values. The processing device may transmit the one or more whitepoint values to the downstream device.

In an example, the first value, the second value, and the one or more whitepoint values may be transmitted in-band as metadata with the image buffer to the downstream device. In an example, the first value, the second value, and the one or more whitepoint values may be transmitted out-of-band as metadata with the image buffer to the downstream device.

In an example, converting the image buffer from a native color space to one or more perceptually uniform color spaces may be based on measuring hue. In an example, measuring hue may comprise evaluating a hue of each pixel of the image buffer and employing the measured hue to select among one or more of a plurality of perceptually uniform color spaces.

The above-described problems are addressed and a technical solution is achieved in the art by providing a decoding method and system. A first processing device receives from a second processing device, an image buffer and a first value. The first processing device converts one or more pixels of the image buffer from a native color space to one or more perceptually uniform color spaces. The first processing device multiplies a lightness channel of the one or more pixels by a reciprocal of the first value. The first processing device receives from the second processing device, a second value and multiplies one or more pixels of one or more color channels by a reciprocal of the second value. The first processing device converts the one or more pixels of the image buffer from the one or more perceptually uniform color spaces to the native color space. The first processing device transmits the image buffer to a downstream device. The first value may be a constant value and the second value may be a constant value.

In an example, the first processing device receives from the second processing device one or more whitepoint values and converts the pixels of the image buffer from the one or more perceptually uniform color spaces to the native color space based on the one or more whitepoint values. In an embodiment, the first value, the second value, and the one or more whitepoint values may be received in-band with the image buffer from the second processing device. In an example, the first value, the second value, and the one or more whitepoint values are received out-of-band with the image buffer from the first processing device.

In an example, the native color space associated with the first processing device may differ from a native color space associated with the second processing device. In an example, the one or more perceptually uniform color spaces associated with the first processing device may differ from the one or more perceptually uniform color spaces associated with the second processing device.

In an example, the downstream device may be one or more of a display, an encoder, or an image processing pipeline.

DETAILED DESCRIPTION

Embodiments of the present disclosure provide high-throughput systems and methods that permit existing image and video transceiver or codec systems and methods to take advantage of the latest and future discoveries regarding human visual system perception of luminance and color without adding excessive processing complexity or excessive memory bandwidth requirements upon either the encoder or decoder. Embodiments of the present disclosure provide additional perceptual quality or efficiency of transmission coding rate or storage size without requiring replacement or modification of encoders or decoders. A method for synchronizing pre-filtering of an encoder and post-filtering of a decoder to signal the presence and configuration of example systems of the present disclosure is described.

More particularly, a high-throughput method and system for improving the perceptual quality and/or the efficiency of compression methods of image and video is disclosed. A system and method according to embodiments of the present disclosure perform the functions of: (1) converting one or more of each pixel of an input image or video to one or more perceptually uniform color and lightness representations, (2) multiplying the lightness channel of each pixel by a first value, and each of the color channels of each pixel by a second value, (3) converting each pixel of the image back to a color and luminance representation appropriate for a compression encoder, encoding the image or video, (4) transmitting or storing the non-zero first and second values as in-band or out-of-band metadata along with the image or video data.

A system and method according to embodiments of the present disclosure perform the functions of: (5) reading or decoding the received image or video along with receiving the metadata, (6) converting the decoded pixels of the image or video to one or more perceptually uniform color and lightness representations, (7) multiplying each pixel of the lightness channel by the reciprocal of the first value, and each pixel of the color channels by the reciprocal of the second value, and (8) converting said image back to a color and luminance representation appropriate for display.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring examples of the present disclosure.

Figure 1:
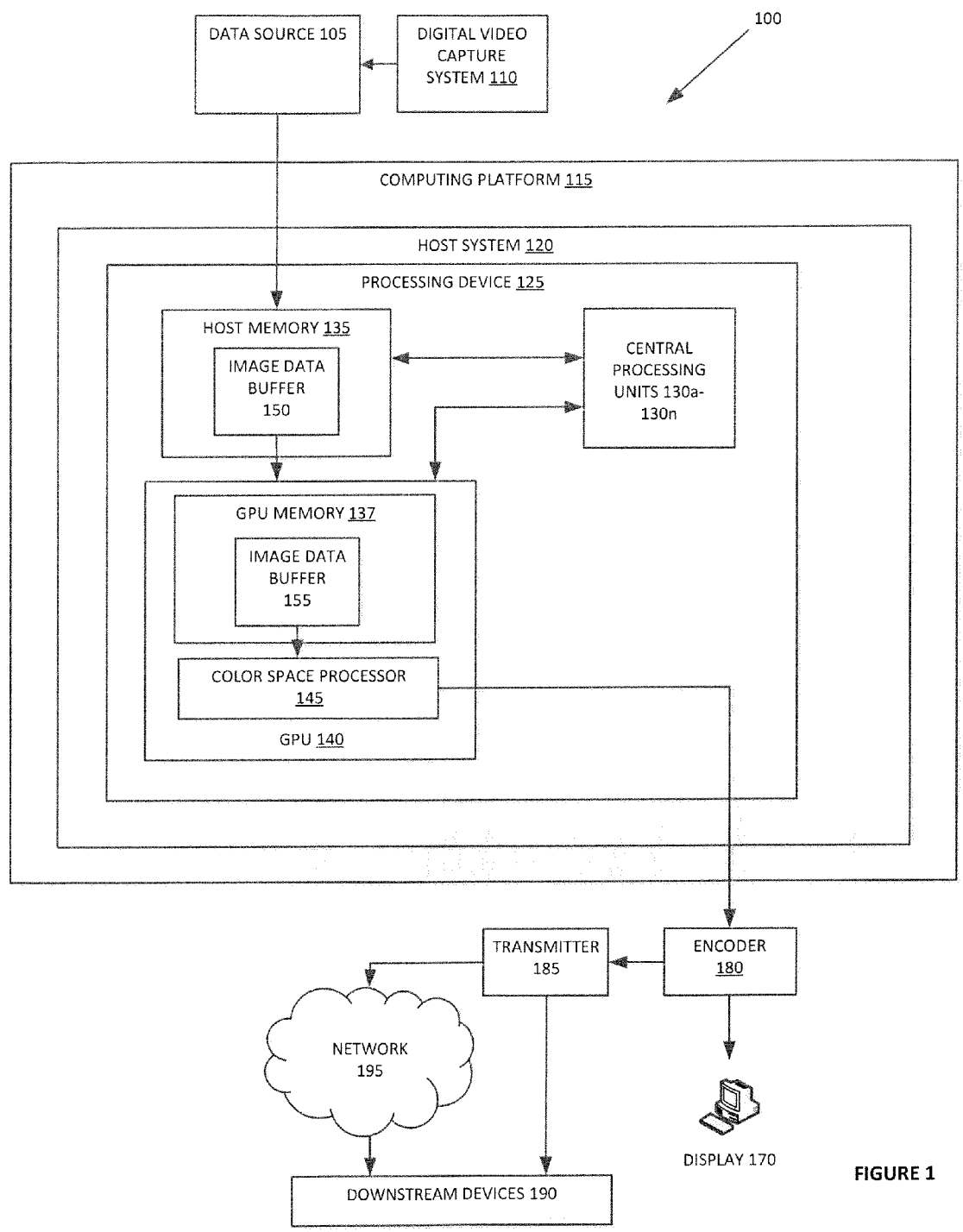
FIG. 1 is a block diagram that illustrates an example of an encoding computing system in which examples of the present disclosure may operate.

FIG. 1 is a block diagram of an example encoding computing system 100 that improves the perceptual quality and/or the efficiency of compression methods of image and video in which examples of the present disclosure may operate. By way of non-limiting example, the computing system 100 receives data from one or more data sources 105, such as a video camera or an on-line storage device or transmission medium. The computing system 100 may also include a digital video or image capturing system 110 and a computing platform 115. The digital video or image capturing system 110 processes one or more images, streams of digital video, or converts analog video to digital video, to a form which can be processed by the computing platform 115 as the one or more data sources 105. The computing platform 115 comprises a host system 120 which may comprise, for example, a processing device 125, such as one or more central processing units 130a-130n. The processing device 125 is coupled to a host memory 135. The host memory 135 may store digital image or video data received from the one or more data sources 105 in an image data buffer 150.

The processing device may further implement a graphics processing unit 140 (GPU). It will be appreciated by those skilled in the art that other co-processor architectures may be utilized besides GPUs, such as, but not limited to, DSPs, FPGAs, or ASICs, or adjunct fixed-function features of the processing device 125 itself. It will further be appreciated by those skilled in the art that the GPU 140 may be collocated on the same physical chip or logical device as the central processing units 130a-130n, also known as an "APU", such as found on mobile phones and tablets. Separate GPU and CPU functions may be found on computer server systems where the GPU is a physical expansion card, and personal computer systems and laptops. The GPU 140 may comprise a GPU memory 137. It will be appreciated by those skilled in the art that the host memory 135 and GPU memory 137 may also be collocated on the same physical chip(s) or logical device, such as on an APU.

The processing device 125 is configured to implement a color space converter and processor 145 (hereinafter "the color space processor 145") to receive data from the data source 105, and to receive the image data buffer 150, which is transferred to the GPU memory 137 as image buffer 155. In one example, the processing device 125 may implement the color processor 145 as a component of the GPU 140. The color space processor 145 is configured to convert one or more of the pixels of the image data buffer 155 from a native color space to one or more perceptually uniform color spaces.

The color space processor 145 is configured to multiply a lightness channel of each pixel of the converted image buffer 155 by a first value, and the color channels of each pixel of the converted image buffer 155 by a second value. The color space processor 145 is further configured to convert one or more pixels of the image buffer 155 from the one or more perceptually uniform color spaces to the original native input color space or a color space suitable for display output or for transmission to an encoder 180. In one example, the converted image data may be displayed on a display 170. In another example, the color space processor 145 may transmit the converted image data to the encoder 180. In one example, the encoder 180 may encode the converted image data using an encoding method known in the art. The encoder 180 may convey the encoded data to a transmitter 185, which transmits the encoded data to one or more downstream devices 190 directly or through a network 195. In one example, one or both of the encoder 180 or the transmitter 185 may be external to the processing device 125 or the computing platform 115. In another example, one or both of the encoder 180 or the transmitter 185 may be integrated with the processing device 125 or the computing platform 115.

Figure 2:
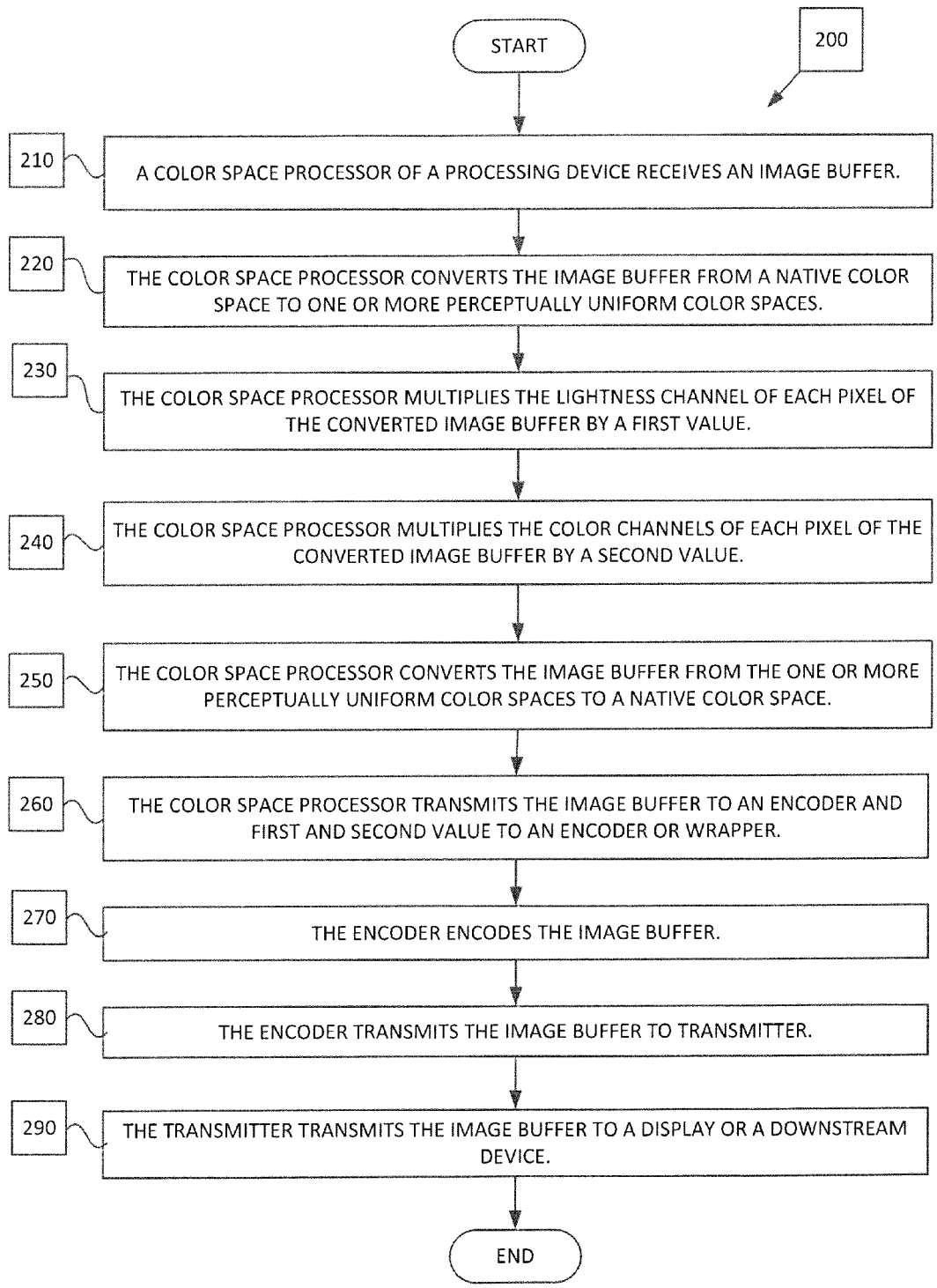
FIG. 2 is a flow diagram illustrating an example of an encoding method associated with the encoding computing system of FIG. 1.

FIG. 2 is a flow diagram illustrating an example of an encoding method 200 that improves perceptual quality and/or efficiency of existing image and video compression methods. The method 200 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 200 is performed primarily by the color space processor 145 of the computing system 100 of FIG. 1.

As shown in FIG. 2, to permit the computing system 100 to encode image data, at block 210, the color space processor 145 receives an image buffer 155. At block 220, the color space processor 145 converts one or more pixels of the image buffer 155 from a native color space to one or more perceptually uniform color spaces. The perceptually uniform color spaces are color spaces wherein two colors of equal Cartesian distance in the color space are substantially equally distant perceptually with respect to the human visual system.

The converted one or more pixels of image buffer 155 may comprise a plurality of pixels, wherein each pixel comprises a lightness channel and one or more color channels. At block 230, the color space processor 145 multiplies the lightness channel of the one or more pixels of the converted image buffer 155 by a first value. In one example, the first value is a constant value. At block 240, the color space processor 145 multiplies the one or more color channels of the one or more pixels of the converted image buffer 155 by a second value. In one example, the second value is a constant value.

At block 250, the color space processor 145 converts the one or more pixels of the image buffer 155 from the one or more perceptually uniform color spaces to the native color space. At block 260, the color space processor 145 transmits the image buffer 155, the first value, and the second value to an encoder 180 or to a multiplexer or wrapper. As used herein a wrapper is a term used in the sense of the SMPTE definition of video file formats, wherein the "essence" describes the codec payload and its contents, and the "wrapper" describes the file format or transmission format or other payload packaging for the essence. As will be appreciated by those skilled in the art, a wrapper may also be interpreted to mean a file format for a single image, such as the JFIF, which describes the standard way JPEG images are to be encapsulated into files. At block 270, the encoder 180 encodes the image buffer 155. At block 280, the encoder 180 transmits the image buffer 155 to a transmitter 185. At block 290, the transmitter 185 transmits the image buffer 155 to one or more of a display 170 or one or more downstream devices 190. In one example, the transmitter 185 transmits the image buffer 155 to the one or more downstream devices 190 (e.g., a second processing device) through a network 195.

In one example, the color space processor 145 may further receive one or more reference whitepoint tristimulus values as described in "*ISO* 11664-4:2008(*E*)/*CIE S* 014-4/*E*:2007: *Joint ISO/CIE Standard: Colorimetry—Part* 4: *CIE* 1976 *L\*a\*b\* Colour Space*" (hereinafter, CIELAB, incorporated herein by reference). The color space processor 145 may convert the one or more pixels of the image buffer from the native color space to the one or more perceptually uniform color spaces based on the one or more whitepoint values. The transmitter may further transmit the one or more whitepoint values to the one or more downstream devices 190. The first value, the second value, and the one or more whitepoint values may be transmitted in-band or out of band with the image buffer 155 to the one or more downstream devices 190.

Figure 3:
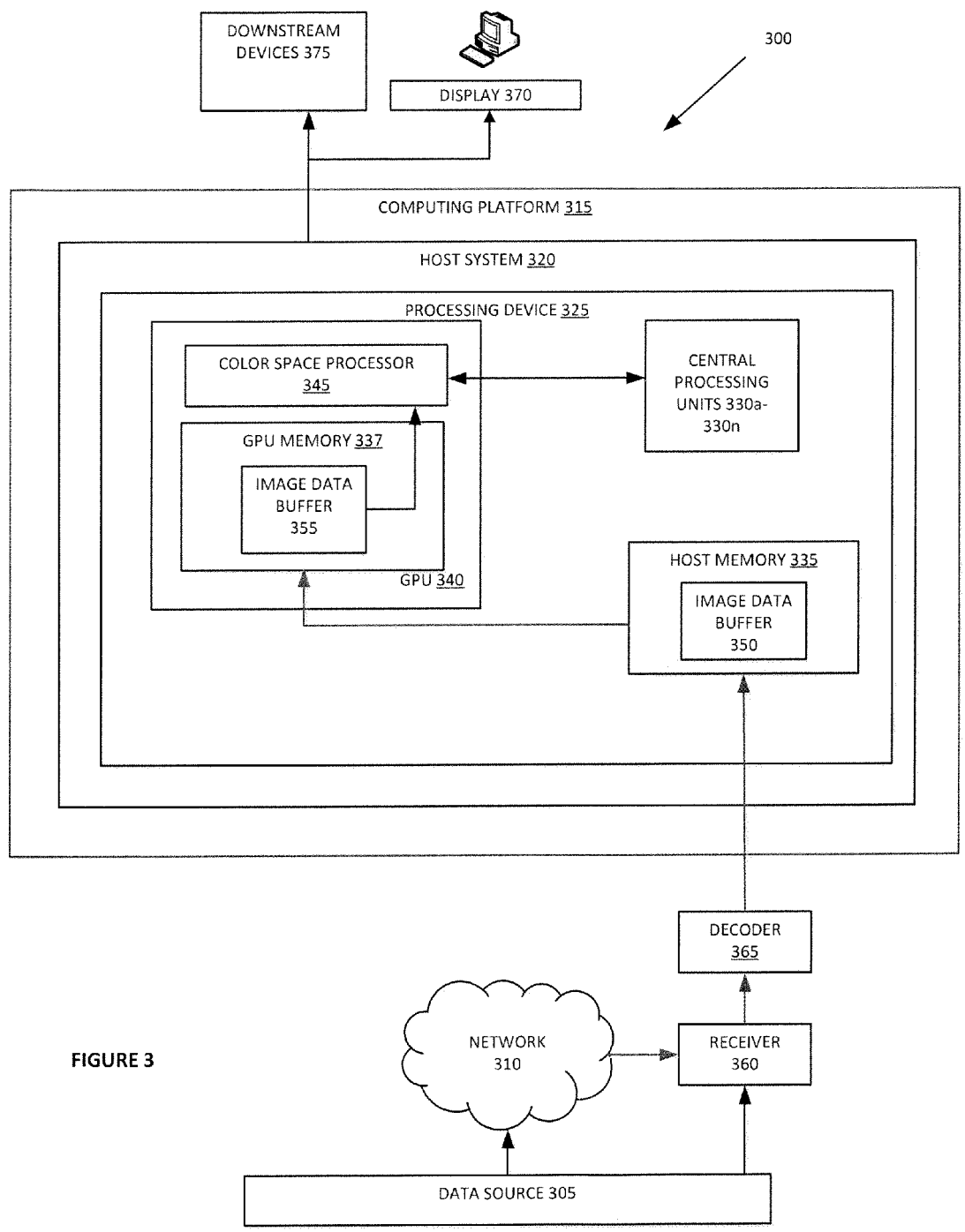
FIG. 3 is a block diagram that illustrates an example of a decoding computing system in which examples of the present disclosure may operate.

FIG. 3 is a block diagram of an example decoding computing system 300 that improves the perceptual quality and/or the efficiency of compression methods of image and video in which examples of the present disclosure may operate. By way of non-limiting example, the computing system 300 is configured to receive encoded data from one or more data sources 305. The one or more data sources 305 may be the encoding computing system 100 of FIG. 1. The computing system 300 may also include a computing platform 315. The computing platform 315 comprises a host system 320 which may comprise, for example, a processing device 325, such as one or more central processing units 330*a*-330*n*. The processing device 325 is coupled to a host memory 335. The host memory 335 may store encoded digital image or video data received from the one or more data sources 305 in an image data buffer 350. The encoded data may be received by a receiver 360, decoded by a decoder 365, and passed to an image data buffer 350. The receiver 360 may receive the encoded data either directed from the one or more data sources 305 or over a network 310. In one example, one or both of the receiver 360 or the decoder 365 may be external to the processing device 325 or the computing platform 315. In another example, one or both of the receiver 360 or the decoder 365 may be integrated with the processing device 325 or the computing platform 315.

The processing device 325 may further implement a graphics processing unit 340 (GPU). It will be appreciated by those skilled in the art that other co-processor architectures may be utilized besides GPUs, such as, but not limited to, DSPs, FPGAs, or ASICs, or adjunct fixed-function features of the processing device 325 itself. It will further be appreciated by those skilled in the art that the GPU 340 may be collocated on the same physical chip or logical device as the central processing units 330*a*-330*n*, also known as an "APU", such as found on mobile phones and tablets. Separate GPU and CPU functions may be found on computer server systems where the GPU is a physical expansion card, and personal computer systems and laptops. The GPU 340 may comprise a GPU memory 337. It will be appreciated by those skilled in the art that the host memory 335 and GPU memory 337 may also be collocated on the same physical chip(s) or logical device, such as on an APU. It will further be appreciated by those skilled in the art that the decoding processing device 325 may be partially or wholly integrated with the encoding processing device 125 into the computing system 100 of FIG. 1 to provide both encoding and decoding functionality.

The processing device 325 is configured to receive encoded image data, a first value, and a second value (e.g., the first value and the second value employed in the encoding system 100 of FIG. 1) from the data source 305 through the receiver 360. The processing device 325 is configured to transfer the first value, the second value, and create the image data buffer 350 based on the received encoded image data to a decoder 365 to decode the image buffer 350, the first value, and the second value. The decoder 365 is configured to transfer the image buffer 350, the first value, and the second value which is transferred to the GPU memory 337 as image buffer 355.

The processing device 325 is configured to implement a color space converter and processor 345 (hereinafter "the color space processor 345") to receive the image buffer 355, the first value, and the second value from the decoder, demultiplexer or unwrapper. In one example, the processing device 325 may implement the color processor 345 as a component of the GPU 340.

The color space processor 345 is configured to convert one or more pixels of image buffer 355 from a native color space to one or more perceptually uniform color spaces. The color space processor 345 is configured to multiply a lightness channel of the one or more pixels of the converted image buffer by a reciprocal of the first value, and the color channels of the one or more pixels of the converted image buffer by a reciprocal of the second value. The color space processor 345 is further configured to convert the one or more pixels of the image buffer 355 from the one or more perceptually uniform color spaces to the original native input color space or a color space suitable for display output on a display 370 or for transmission to one or more downstream devices 375 (e.g., an encoder).

Figure 4:
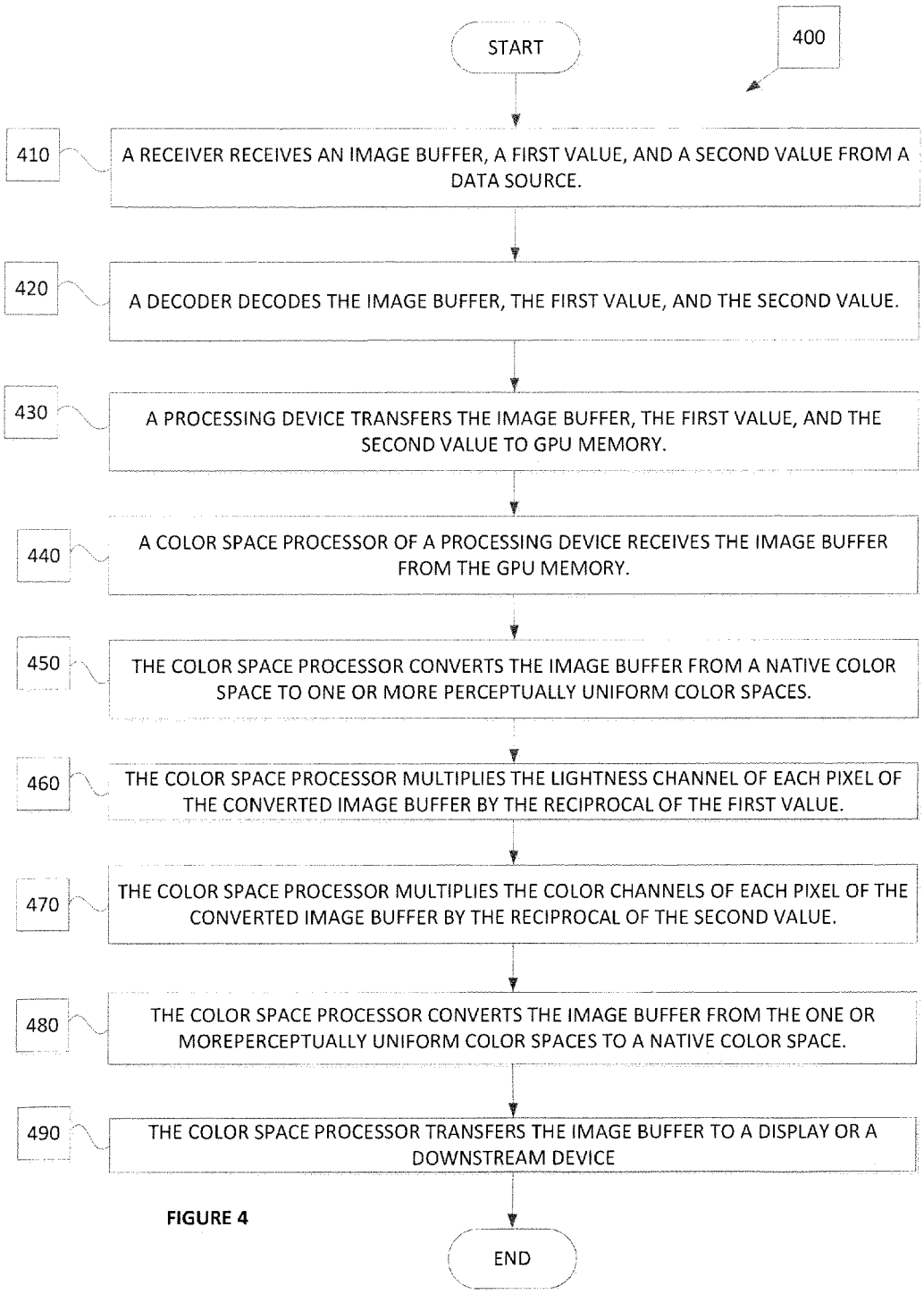
FIG. 4 is a flow diagram illustrating an example of a decoding method associated with the encoding computing system of FIG. 3.

FIG. 4 is a flow diagram illustrating an example of a decoding method 400 for improving perceptual quality and/or efficiency of existing image and video compression methods. The method 400 may be performed by a computer system 300 of FIG. 3 and may comprise hardware (e.g., circuitry, dedicated logic, programmable logic, microcode, etc.), software (e.g., instructions run on a processing device), or a combination thereof. In one example, the method 300 is performed primarily by the color space processor 345 of the computing system 300 of FIG. 3.

As shown in FIG. 4, to permit the computing system 300 to decode image data, at block 410, a receiver 360 receives encoded image data, a first value, and a second value from the data source 305. At block 420, a decoder 365 decodes the image buffer 355, the first value, and the second value, and places the decoded data in an image data buffer 350 of the processing device 325. At block 430, the processing device 325 transfers the decoded image buffer 355, the first value, and the second value to GPU image buffer 355 of the GPU memory 337. At block 440, the color space processor 345 receives the image buffer 355, the first value, and the second value from GPU memory 337.

The converted image buffer 355 may comprise a plurality of pixels, wherein each pixel comprises a lightness channel and one or more color channels. At block 450, the color space processor 345 converts one or more pixels of the image buffer 355 from a native color space to one or more perceptually uniform color spaces. At block 460, the color space processor 345 multiplies the lightness channel of one or more pixels of the converted image buffer 355 by a reciprocal of the first value. In one example, the first value is a constant value. At block 470, the color space processor 345 multiplies the one or more color channels of the one or more pixels of the converted image buffer 355 by a reciprocal of the second value. In one example, the second value is a constant value.

At block 480, the color space processor 345 converts the image buffer 355 from the one or more perceptually uniform color spaces to the native color space or to a color space suitable for display output on a display 370 or for transmission to one or more downstream devices 375 (e.g., an encoder through the network 310). At block 390, the color space processor 345 outputs the image buffer to a display 370 or a downstream device 375.

In one example, the color space processor 345 may further receive one or more whitepoint values from the receiver 360. The color space processor 345 may employ the one or more whitepoint values in converting the one or more pixels of the image buffer from the one or more perceptually uniform color spaces to the native color space based. In one example, the first value, the second value, and the one or more whitepoint values are received in-band or out-of-band with the image buffer 255 from the data source 305 (e.g., the computing system 100 of FIG. 1).

In one example, the native color space associated with the processing device 325 may differ from a native color space associated with the data source 305 (e.g., the processing device 125 of FIG. 1). In one example, the perceptually uniform color spaces associated with the processing device 325 may differ from the perceptually uniform color spaces associated with the with the data source 305 (e.g., the processing device 125 of FIG. 1).

Embodiments of the present disclosure are operable to provide a high-throughput, efficient system and method for permitting existing in-place YCbCr-based compression systems to achieve either better perceptual quality or reduced coding rate by leveraging the latest or future discoveries of perceptual color science while maintaining compatibility with YCbCr-based compression as the transmission medium and color space. As a result, entropy and redundancy in both the luminance channel and chrominance channels may be reduced without requiring direct modification to either an encoder or a decoder, or a transmitter or receiver.

The YCbCr color space has significant perceptual redundancies, especially at the upper and lower bounds of the color space volume along the luminance or Y-channel axis. It has long been recognized that an ideal image or video compression system should chose a perceptually uniform color space as a basis for symbolic representation. As used herein, perceptual uniformity means that two colors of equal Cartesian distance in a color space volume are also equally distant perceptually.

Figure 5:
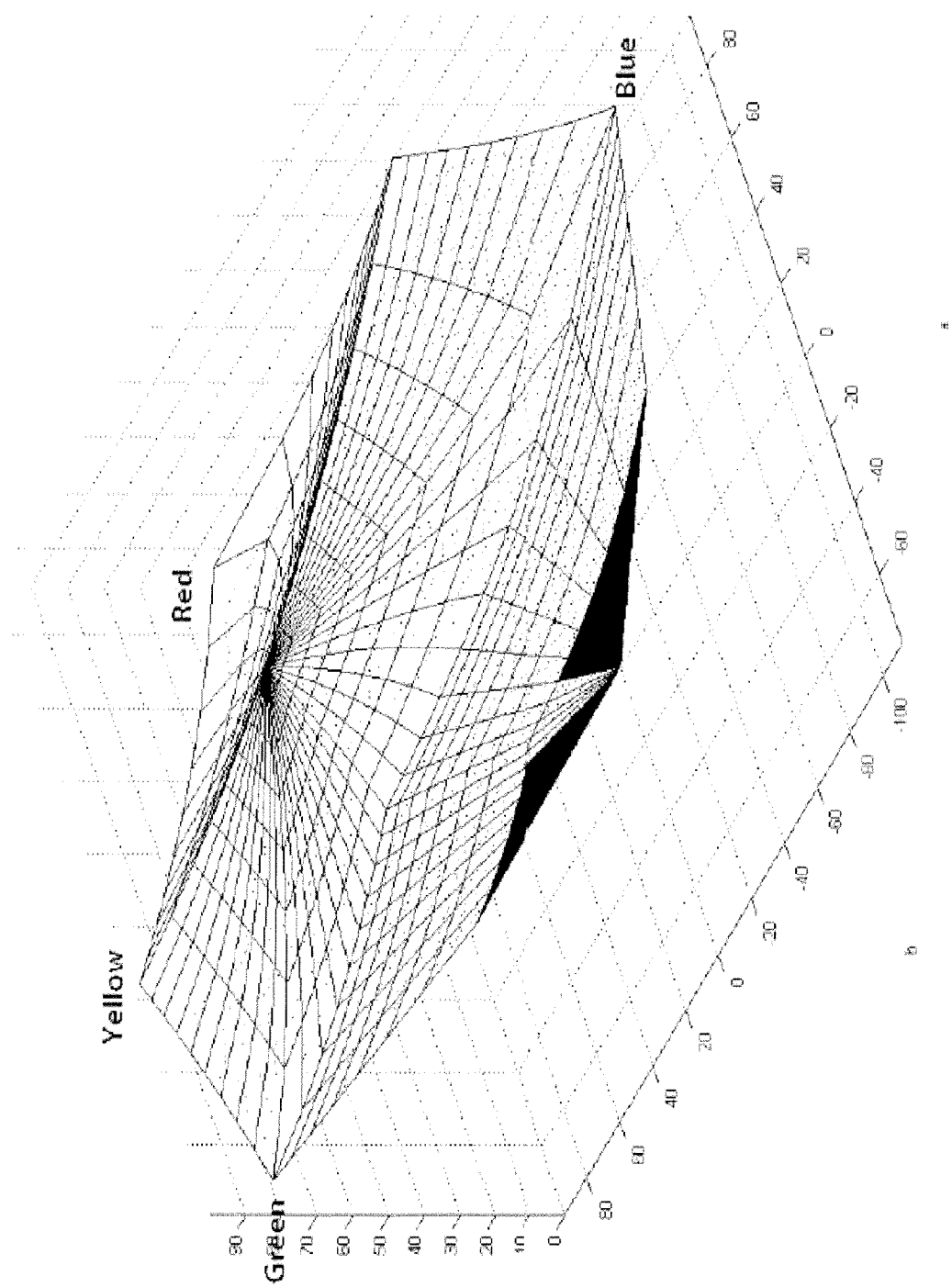
FIG. 5 shows the YCbCr gamut volume plotted within the CIELAB color space.

FIG. 5 is a projection rendering of the CIELAB color space in three dimensions, in which boundaries of the YCbCr color space are outlined as a wireframe shape. CIELAB color space is a much larger color space than YCbCr color space. It is noted that the YCbCr gamut volume subtended within the CIELAB color space has an irregular shape. The YCbCr color space gamut volume within the CIELAB color space shows "stretching". These stretched areas represent areas of the volume where YCbCr-based coding systems and compression systems devote "too much" coding-rate to representing perceptual color differences relative to other colors. If the YCbCr color space were exactly perceptually uniform with respect to CIELAB, its gamut volume would be an exact cube. Expressed another way, the compacted areas represent areas of the volume where YCbCr-based coding systems devote "too little" coding rate to representing perceptual color differences relative to the other colors.

Figure 6:
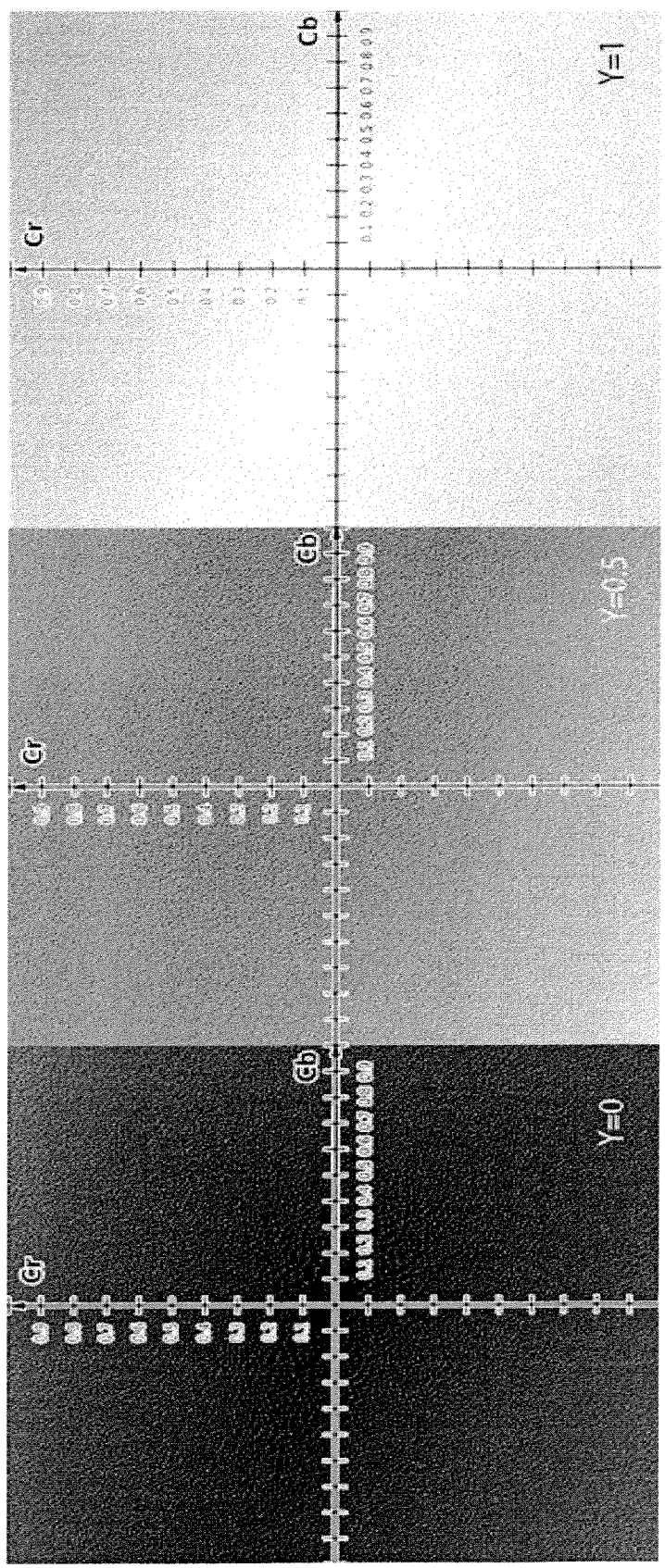
FIG. 6 shows three cross sections of the normalized YCbCr color space at Y=0, Y=0.5, and Y=1.

FIG. 6 shows three cross sections of the normalized YCbCr color space at Y=0, Y=0.5, and Y=1.

Figure 7:
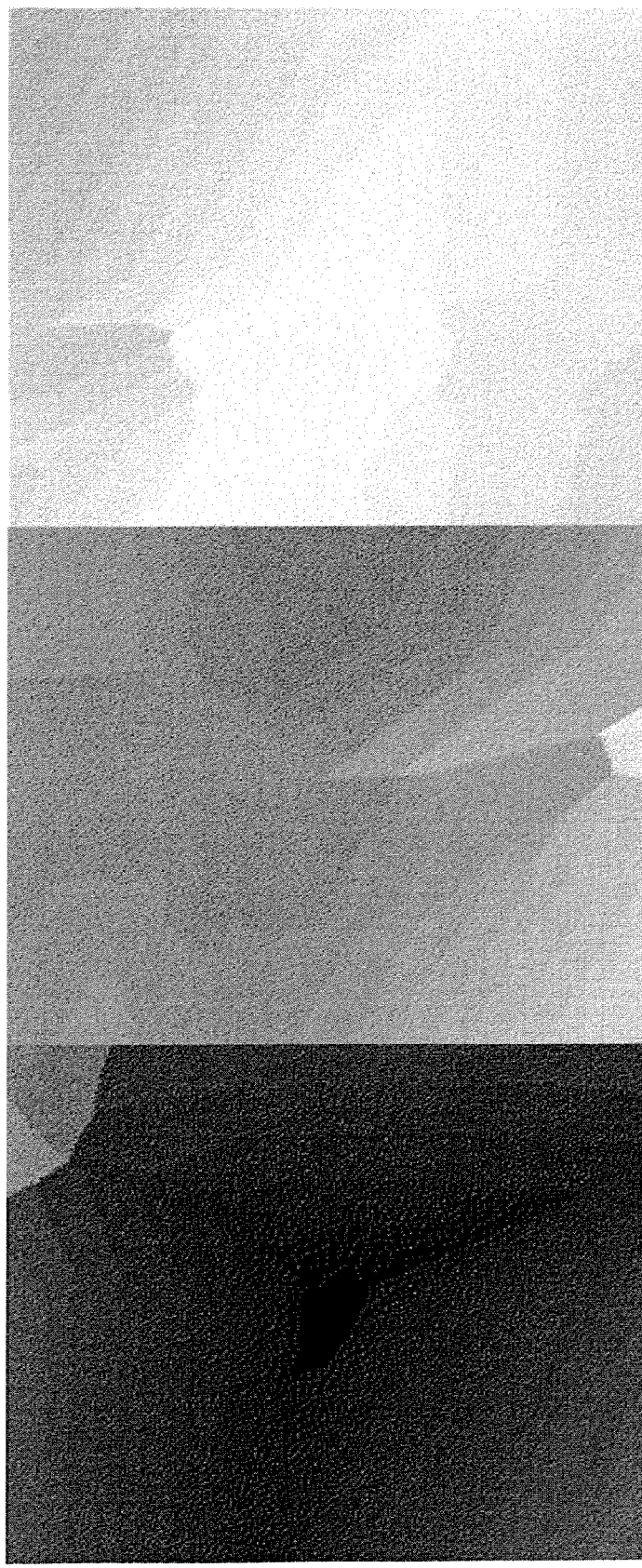
FIG. 7 shows cross sections of FIG. 6 converted to CIELAB color space, after quantization to 8-bits of precision.

FIG. 7 shows the cross sections of FIG. 6 converted to CIELAB color space, which has a more uniform approximation of HVS perceptual sensitivity, and which is quantized to 8-bit precision. It should be noted that some colors of the original YCbCr space occupy more area than the rest.

Figure 8:
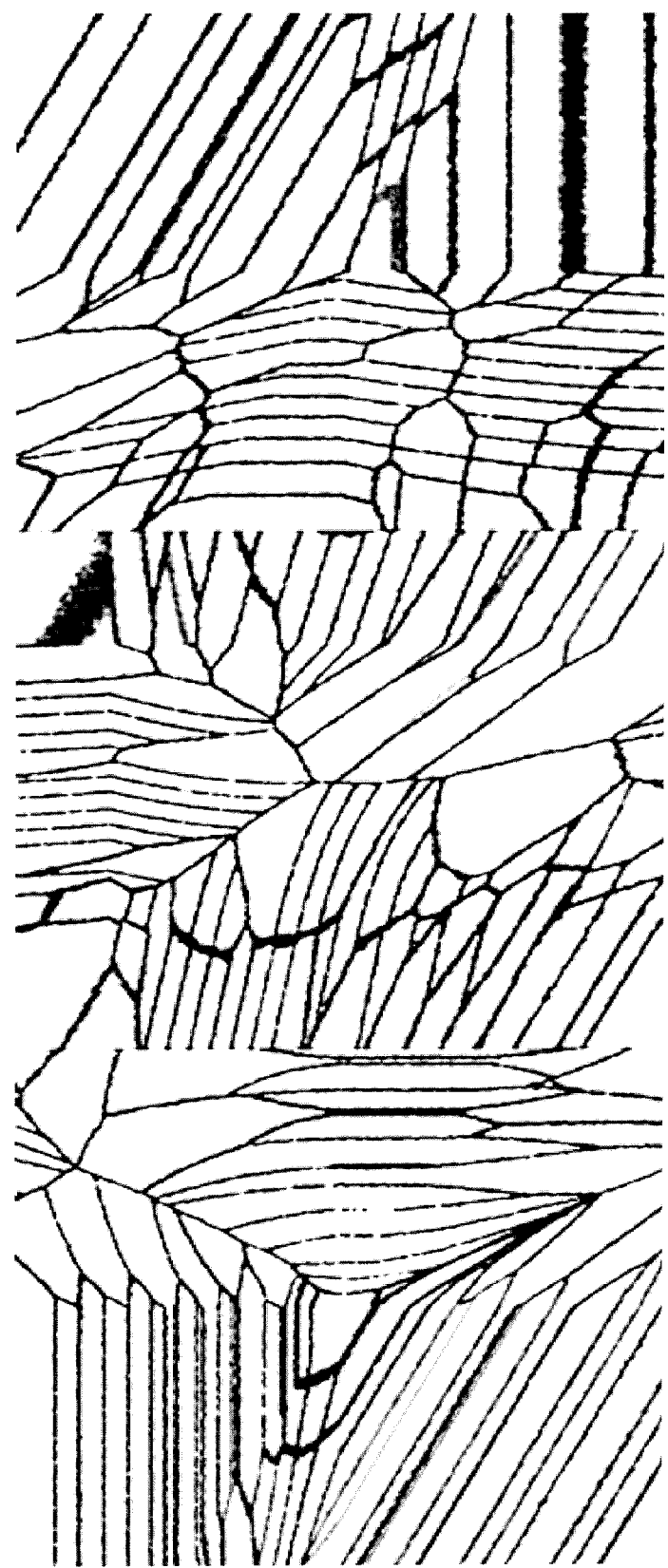
FIG. 8 shows the cross sections of FIG. 7 converted to CIELAB color space, to illustrate quantization contour boundaries.

FIG. 8 shows the quantization contour boundaries of FIG. 7. The regions of FIG. 7 show non-uniform distribution—the large regions show "wasted" coding rate whenever a video or image coding or compression system utilizes the YCbCr color space. If YCbCr color space were perfectly efficient, the regions shown would all have the same approximate area. It should be noted in FIG. 8 that wasted coding rate is concentrated along the Cb axis for the lower luminance values where Cb is smaller than 0, and along the Cb axis for the higher luminance values where Cb is greater than 0.

In instances of YCbCr-based systems such as JPEG, MPEG/H.262/H.263, AVC/H.264, and HEVC/H.265, the problem not only extends to the color channels—it has been discovered that the luminance assumption of YCbCr does not exactly match the HVS sensitivity to brightness. For this reason, there is also redundancy in the Y channel of YCbCr color space that can contribute to artifacts and/or transmission inefficiency, especially in the dark region of the luminance range.

More practically, artifacts can be seen when viewing decoded dark scenes with high saturation, such as concert videos, which tend to have high contrast, and bright, colored lights. In such circumstances, color-banding or posterization artifacts with typical encoding systems are evident, especially in coding-rate-constrained or transmission network congestion conditions. These quality deficiencies may be prevented or mitigated when examples of the present disclosure are used in conjunction with a YCbCr-based coding or compression system.

Examples of the present disclosure provide a high-throughput, efficient system and method for permitting existing in-place CIE1931 XYZ-based compression systems to achieve either better perceptual quality or reduced coding-rate. Examples of the present disclosure may leverage the latest or future discoveries of perceptual color science, while maintaining CIE1931 XYZ color space as the transmission medium and assumption of color space to reduce entropy and redundancy in the luminance channel without requiring direct modification to either the encoder or decoder, or transmitter or receiver.

In instances of CIE1931 XYZ-based systems such as JPEG2000, the problem is more acute with the luminance assumption of CIE1931 XYZ not being the closest representation known to match HVS sensitivity to brightness. For this reason, there is redundancy in the Y channel of CIE1931 XYZ color space that can contribute to artifacts and/or transmission inefficiency.

Figure 9:
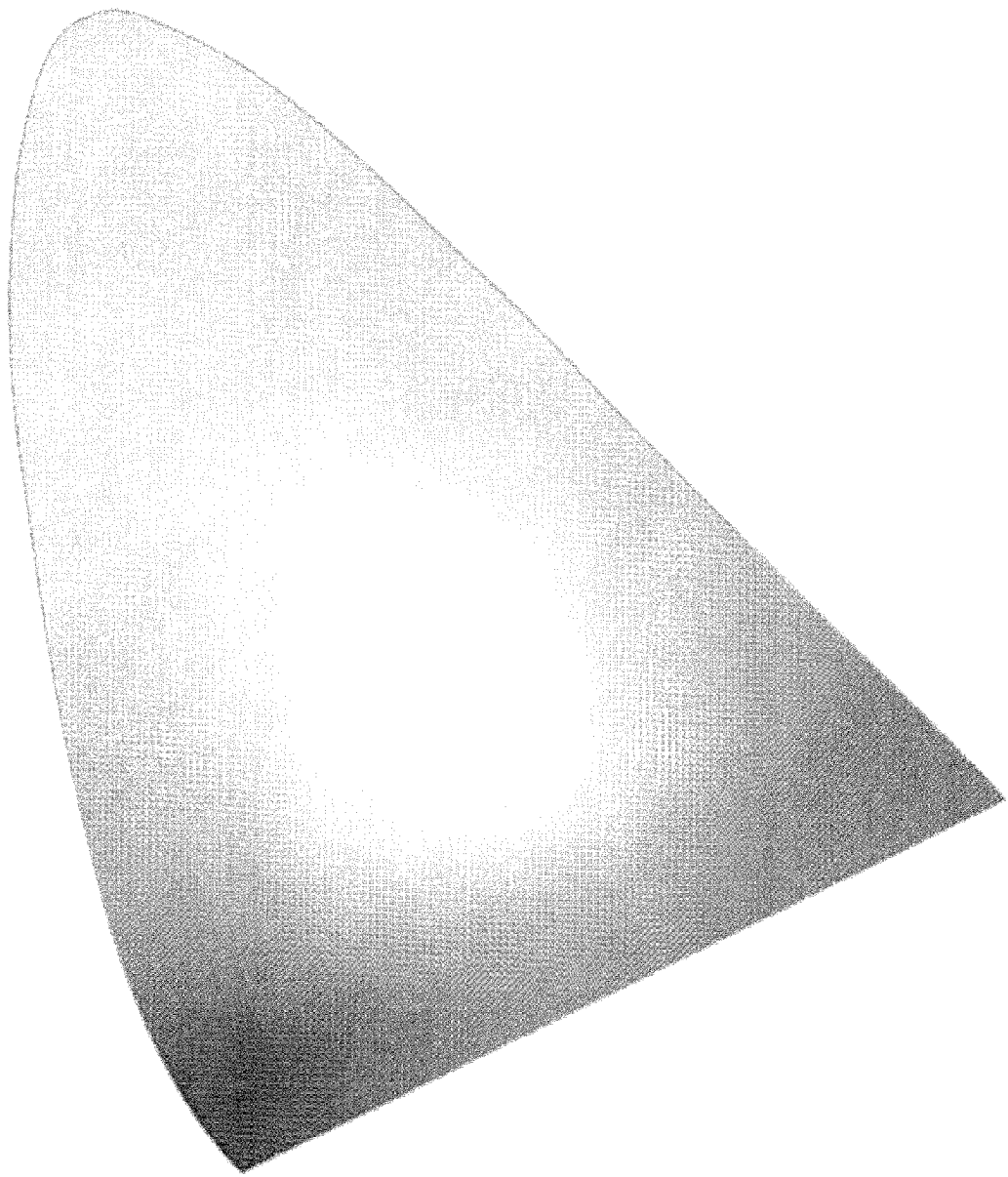
FIG. 9 shows a cross section of the normalized CIE1931 XYZ color space at Z=1.

FIG. 9 shows a cross section of the normalized CIE1931 XYZ space at Z=1.

Figure 10:
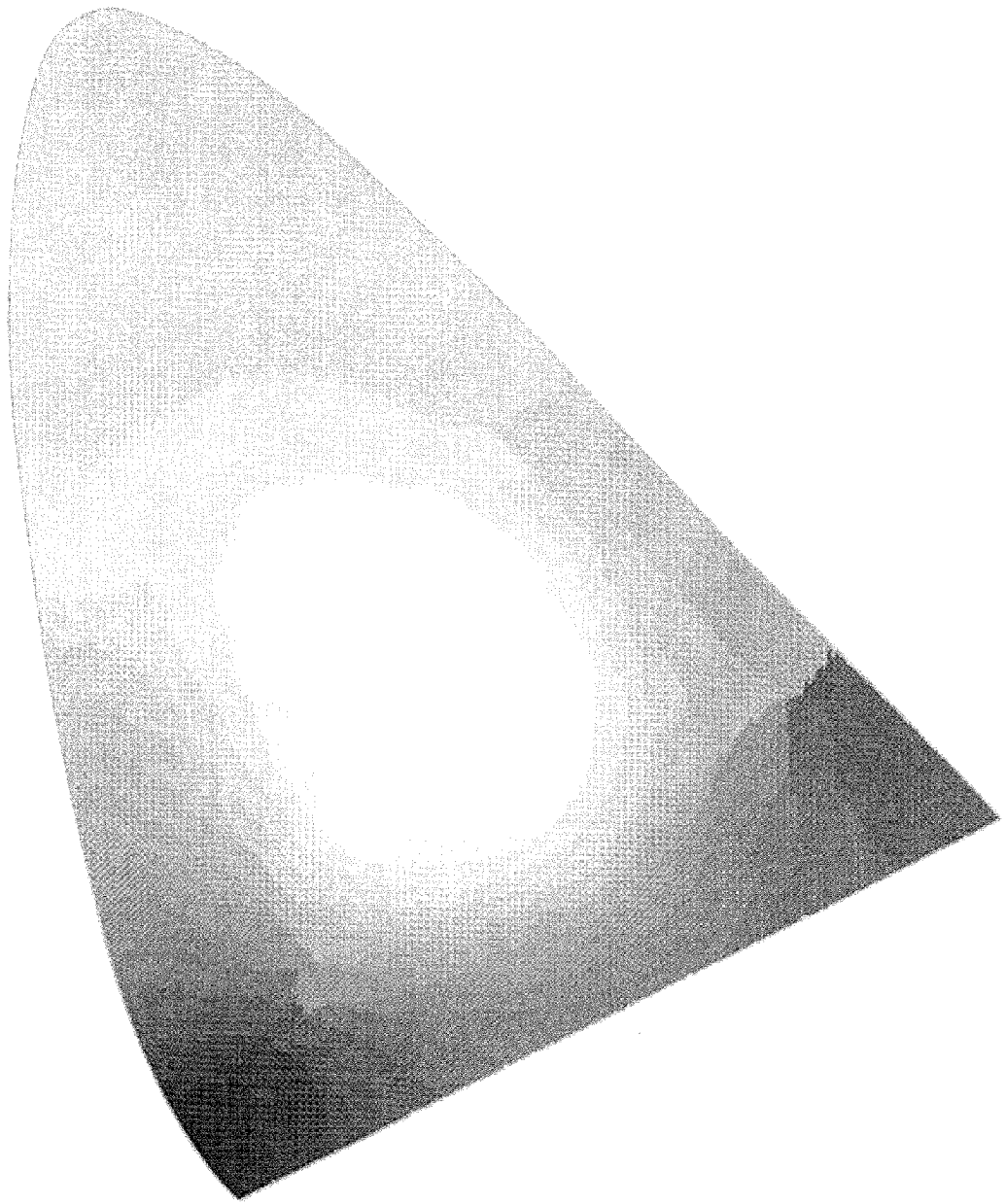
FIG. 10 shows the cross section of FIG. 9 converted to CIELAB color after quantization to 8-bits of precision.

FIG. 10 shows the cross section of FIG. 9 converted to CIELAB color space, a more uniform approximation of HVS perceptual sensitivity, quantized to 8-bit precision. It can be seen that some colors of the original CIE1931 XYZ space occupy more area than the rest.

Figure 11:
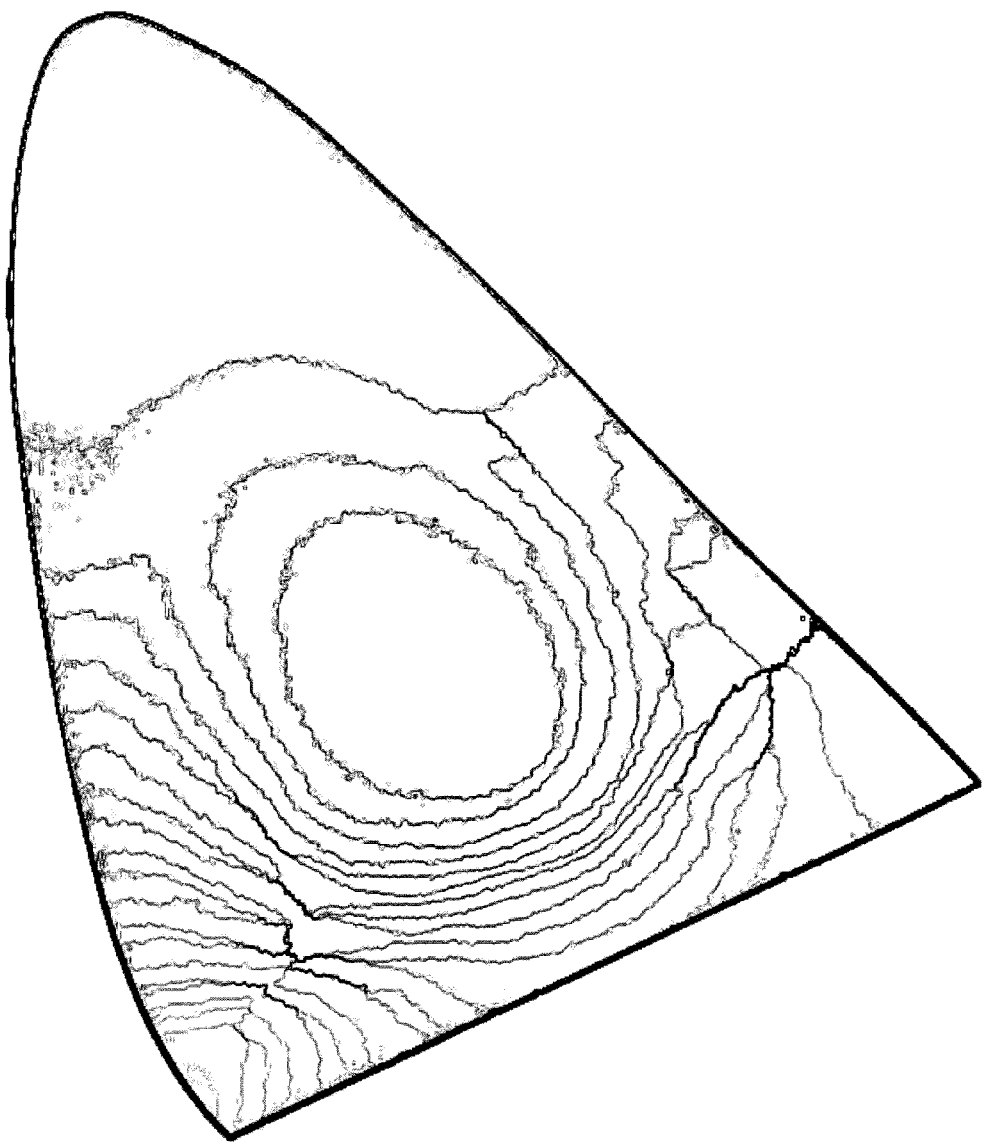
FIG. 11 shows the cross section of FIG. 8 converted to CIELAB color space, quantized to illustrate quantization contour boundaries.

FIG. 11 shows the quantization contour boundaries of FIG. 10. The regions of FIG. 10 show non-uniform distribution— the large regions show "wasted" coding rate whenever a video or image coding or compression system utilizes the CIE1931 XYZ color space. If CIE1931 XYZ color space were perfectly efficient, the regions shown would all have the same approximate area.

As a practical matter, what this means is that even recent JPEG2000-based systems such as Digital Cinema Package can be made more efficient with no noticeable perceptual differences.

Additionally, embodiments of the present disclosure may provide a high-throughput system and method that can leverage future refinements and standards for color representation as more accurate data and standards pertaining to HVS color and brightness perception and processing become available. Future color space representations as published by CIE may increase in complexity, but result in a more perceptually uniform representation. Embodiments of the present disclosure only depend on the resultant perceptually uniform color space transformation (and its inverse transform) to be uniform with respect to HVS perceptual differences, which permits the embodiments described herein to be effective, since the system and methods herein do not rely on a color look-up-table or any non-linear mathematical operations.

Figure 12:
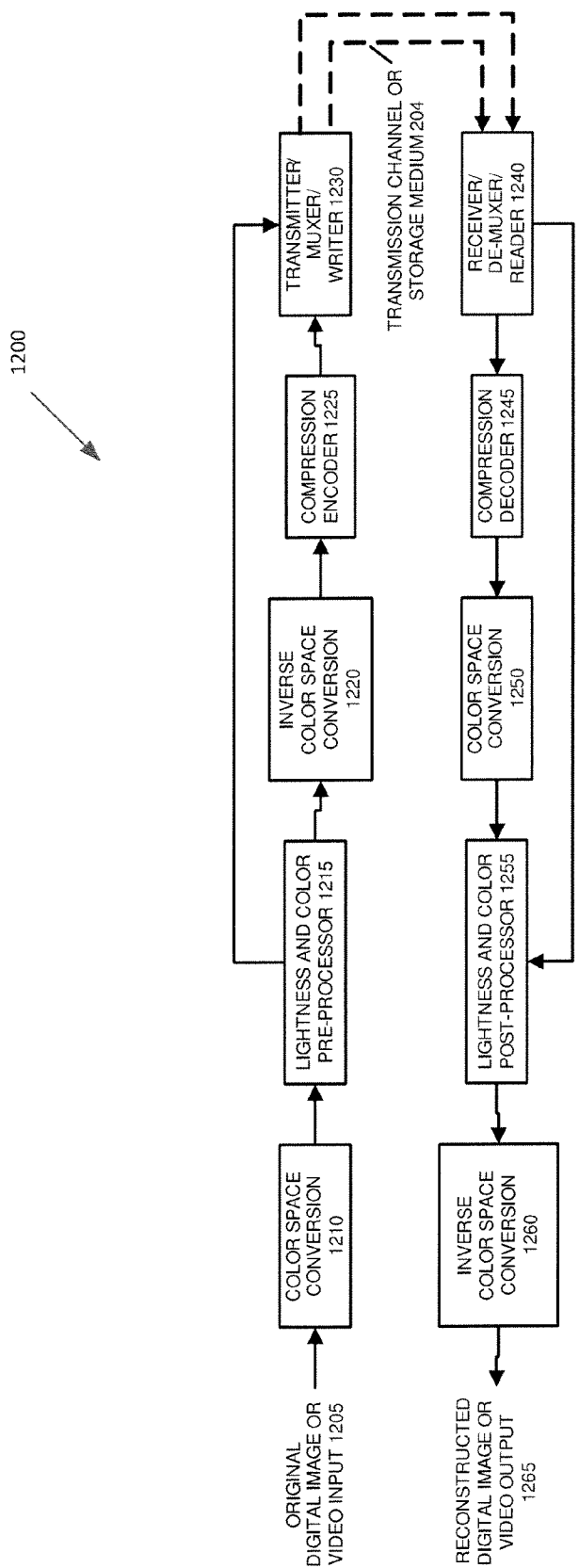
FIG. 12 is a block diagram of an example implementation of the computing systems of FIGS. 1 and 3 working in conjunction.

FIG. 12 is a block diagram of an example implementation 1200 of the computing systems 100, 300 of FIGS. 1 and 3 working in conjunction. The example implementation 1200 of the computing systems 100, 300 of FIGS. 1 and 3 comprise an implementation in hardware (e.g., circuitry, dedicated logic, programmable logic, microcode, etc.), software (e.g., instructions run on a processing device), or a combination thereof.

As shown in FIG. 12, an original digital image or video input 1205 is input to a first color space conversion process 1210. This first color space conversion process 1205 converts from a native color space such as YCbCr color space or R'G'B' color space to a perceptually linear color space such as CIELAB, CIELUV, or SRLAB2, by way of non-limiting examples. Converting R'G'B' color space to L*a*b* color space, is a two-step process involving a first conversion to CIE1931 XYZ color space as shown in Eq. 1:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \times \begin{bmatrix} R' \\ G' \\ B' \end{bmatrix}$$

The next step is to convert to L*a*b* color space, given a set of three assumed reference whitepoint tristimulus values as shown in Eq. 2:

$$L^* = 116 f\left(\frac{Y}{Y_n}\right) - 16$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

where the normalized relative luminance tristimulus values for the CIE standard D65 whitepoint used in Eq. 2 are shown in Eq. 3:

$X_n$=95.047, $Y_n$=100.0, $Z_n$=108.883 where function $f()$ of Eq. 2 is defined in Eq. 4:

$$f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases}$$

It will be appreciated by those skilled in the art that many methods may be used to effect direct conversion from native color space formats to L*a*b* color space, and that the equations above are a non-limiting example and are provided for purposes of illustration and clarity. Additionally, those skilled in the art will realize that the choice of whitepoint should be influenced by the lighting, the configuration data of the originating camera or capture system, and may be changed depending on input content and its associated colorimetric metadata.

Next, each channel of each pixel of the digital image is then multiplied by two user-provided values $D_L$ and $D_{ab}$ by a lightness and color pre-processor 1215 as in Eq 5:

$$\begin{bmatrix} L_1^* \\ a_1^* \\ b_1^* \end{bmatrix} = \begin{bmatrix} D_L \\ D_{ab} \\ D_{ab} \end{bmatrix} \times \begin{bmatrix} L^* \\ a^* \\ b^* \end{bmatrix}$$

where typical values of $D_L$ lie between 0.8 and 0.95, and typical values of $D_{ab}$ lie between 0.5 and 0.8.

Next, the modified values $L_1^*$, $a_1^*$, and $b_1^*$ are converted back to the original native color space such as YCbCr color space or R'G'B' color space by a first inverse color conversion process 1220. This is normally a two-step process, where the first step is to convert back to CIE1931 XYZ color space, as shown in Eq. 6:

$$Y = Y_n f^{-1}\left(\frac{1}{116}(L_1^* + 16)\right)$$

$$X = X_n f^{-1}\left(\frac{1}{116}(L_1^* + 16) + \frac{1}{500}a_1^*\right)$$

$$Z = Z_n f^{-1}\left(\frac{1}{116}(L_1^* + 16) + \frac{1}{200}b_1^*\right)$$

Where $f^{-1}(t)$ is given in Eq. 7:

$$f^{-1}(t) = \begin{cases} t^3 & \text{if } t > \frac{6}{29} \\ 3\left(\frac{6}{29}\right)^2\left(t - \frac{4}{29}\right) & \text{otherwise} \end{cases}$$

Then the CIE1931 XYZ image buffer is converted back to the original native color space, which in the case of R'G'B' color space is given by Eq. 8:

$$\begin{bmatrix} R' \\ G' \\ B' \end{bmatrix} = \begin{bmatrix} 3.2404542 & -1.5371385 & -0.4985314 \\ -0.9692660 & 1.8760108 & 0.0415560 \\ 0.0556434 & -0.2040259 & 1.0572252 \end{bmatrix} \times \begin{bmatrix} X \\ Y \\ Z \end{bmatrix}$$

Again, it will be appreciated by those skilled in the art that many methods may be used to effect direct conversion from L*a*b* color space to native color space formats, and that the equations above are a non-limiting example and are provided for purposes of illustration and clarity.

As discussed hereinabove, there exists no perfectly perceptually uniform color space representation, although there have been attempts at achieving a "good-enough" approximation. All of the latest color space representations such as CIELAB, CIECAM02, and SRLAB2 have certain uniformity tradeoffs, such as hue uniformity, or hue linearity along the luminance or lightness dimension. The result of these imperfections is that the magnitude of the values of $D_L$ and $D_{ab}$ are limited before visible artifacts become evident at the display 370. This limitation directly influences the coding efficiency gains that may be achieved, since the smaller the magnitude of $D_L$ and $D_{ab}$, the less entropy the encoder (and decoder) needs to code.

Another example of the color space processor 345 and 145 improves this efficiency by evaluating the hue of each pixel of the image data buffer input 355 and 155 and by employing this hue value to determine whether to convert a given pixel using CIELAB—which has good hue uniformity characteristics for values between magenta, red, yellow, and green—or SRLAB2, which has good hue uniformity characteristics for values between green, cyan, blue, and magenta. Hue as described herein is calculated from RGB, for example, by Eq. 9:

$$\max RGB = \max(R, G, B)$$

$$\min RGB = \min(R, G, B)$$

$$\text{chroma} = \max RGB - \min RGB$$

$$\text{Hue} = \begin{cases} NaN, & \text{if chroma} = 0 \\ \dfrac{(G-B)}{\text{chroma}} \bmod 6, & \text{if } \max RGB = R \\ \dfrac{(B-R)}{\text{chroma}} + 2, & \text{if } \max RGB = G \\ \dfrac{(R-G)}{\text{chroma}} + 4, & \text{if } \max RGB = B \end{cases}$$

In one example, when Hue as previously calculated is larger than a first hue cutoff point, e.g., 3.0 (green in the aforementioned numerical representation of Hue) or Hue is less than a second hue cutoff point, e.g., 0.0 (magenta), an alternate color space conversion can be applied. By way of a non-limiting example, these cut-off-points may represent the green-cyan-blue range according to Eq. 9, given an RGB source, which is the color representation most challenged by CIELAB in terms of hue-constancy, and SRLAB2 may be utilized as the alternate color conversion transform; otherwise CIELAB may be utilized within the color space conversion. It will be appreciated by those skilled in the art that other approximated, perceptually uniform color transforms may be substituted such as CIELUV, HunterLAB, or CIECAM02 by way of non-limiting examples. Furthermore, the choice of color spaces such as CIELAB, CIELUV, CIECAM02, SRLAB2, or future representations of substantially perceptually uniform color spaces for one or more of the foregoing hue ranges are immaterial to the effective function of the present example, so long as an effective proper hue range for each is selected, and that each color space representation is perceptually uniform within its utilized hue range. By utilizing this method, the previous minimum values of $D_L$ and $D_{ab}$ can be expanded from 0.8 and 0.5, respectively, to 0.5 and 0.11, with concomitant benefits for encoder efficiency with no visible reduction in decoded, rendered quality. The hue decision process is local to both the originating color processor 1215, and the receiving color processor 1255. Whether a given pixel was processed by a given color space may be communicated between the color space conversion 1210 and inverse color space conversion 1220, or between the color space conversion 1250 and inverse color space conversion 1260, by out-of-band, or in-band means, such as via the alpha channel of an four-channel image buffer, or a separate data buffer, or via any other means suitable to convey information for each pixel about which color conversion was employed. It should be noted that the color space decision information does not need to be conveyed along the communication channel—only locally—so long as hue-constancy is observed with respect to the color space conversion processes 1210 and 1260. The first inverse color conversion process 1220 outputs the transformed image data to an encoder 1225, and conveys the values of $D_L$ and $D_{ab}$ and optionally the whitepoint $X_n, Y_n, Z_n$, utilized by the first color conversion process 1210 to either the encoder 1225 or directly to a transmitter/muxer/writer 1230. It will be appreciated by those skilled in the art that in many cases the file format encapsulation or stream muxing process may be co-located with the encoder 1225. Additionally, these values may be conveyed to the encoder 1225 or transmitter/muxer/writer 1230 so that they are communicated to a downstream receiver/demuxer/reader process 1240, and do so in such a way to not require a custom implementation of the encoder 1225, a decoder 1245, the transmitter/muxer/writer 1230, or the receiver/demuxer/reader 1240 processes. As is well-known in the art, file and stream formats offer a variety of ways to accomplish this.

By way of a non-limiting example, the JPEG File Interchange Format (hereinafter, JFIF) is commonly used to encapsulate JPEG compressed imagery, and JFIF specifies well-known metadata extensions in many formats including EXIF, ICC profile, and Picture Info, any of which can be used to convey information about the presence and values of the $D_L$, $D_{ab}$, and optional $X_n, Y_n, Z_n$ values.

By way of non-limiting example, H264 encoded bitstreams support the inclusion of optional supplemental enhancement information (SEI) headers, in which can be embedded the $D_L$, $D_{ab}$, and optional $X_n, Y_n, Z_n$ values. These methods require no changes to the encoder (or decoder) processes 1225, 1245, but simply the ability to output these values to either the encoder 1225 or the transmitter/muxer/writer 1230, and concomitantly to query these values from the downstream decoder 1245 or the receiver/demuxer/reader 1240.

Other ways to convey the metadata are not coupled to the coder or codec format at all, but to the transport stream itself. By way of non-limiting examples, these include the ES Descriptor of MPEG Transport streams which may be used for the purposes described herein, and also via RTP extension headers.

It will be appreciated by those skilled in the art that while many conveyance methods for the $D_L$, $D_{ab}$, and optional $X_n, Y_n, Z_n$ values are possible, the desirable characteristics needed for the present invention include independence of an encoder and a decoder implementation, and access to these conveyed metadata via API or other methods by processes external to the aforesaid encoders, decoders, transmitters, receivers, muxers, demuxers, readers and writers. This may also include completely out-of-band conveyance, such as standardization of particular encoders and decoders upon values of the $D_L$, $D_{ab}$, and optional $X_n, Y_n, Z_n$ values, or communication of these values by other channels and contexts, such as by the manifest files of MPEG-DASH or HLS streams, or by separate files or protocols by way of non-limiting examples.

Along with the compressed image or video data itself, the metadata is optionally transmitted or communicated from the upstream transmitter/muxer/writer 1230 via a transmission channel 1235 or storage medium to the downstream receiver/demuxer/reader 1240 which de-encapsulates the image or video data into a form suitable for the decoder 1245, and which outputs the data to a second color space conversion process 1250. The second color space conversion process 1250 converts from a native color space to one or more perceptually uniform color spaces, in the same manner as the first color space conversion process 1205 described by Eq. 1 to Eq. 4 and optionally wherein the particular perceptually uniform color space is selected for each pixel by Eq. 9, by way of non-limiting examples. It will be appreciated by those skilled in the art that the native color space provided by the decoder 1245 may be different from that supplied to the encoder 1225, and a different conversion process would be necessary. It will further be appreciated that the perceptually uniform color spaces utilized by the first lightness and color pre-processor 1215 may be different from the one or more perceptually uniform color spaces utilized by the decoder 1245, the only requirement implied being that all are each substantially perceptually uniform.

The converted image data is output to a lightness and color post-processor 1255. Additionally, either the receiver/demuxer/reader 1240 or the decoder 1245 supplies to the lightness and color post processor 1255 the $D_L$, $D_{ab}$, and optional $X_n$, $Y_n$, $Z_n$ values, by any of the aforesaid metadata communication methods or a comparable method.

The lightness and color post processor 1255 multiplies each channel of each pixel of the digital image by the supplied two values $D_L$ and $D_{ab}$ as in Eq 10:

$$\begin{bmatrix} L^* \\ a^* \\ b^* \end{bmatrix} = \begin{bmatrix} 1/D_L \\ 1/D_{ab} \\ 1/D_{ab} \end{bmatrix} \times \begin{bmatrix} L_1^* \\ a_1^* \\ b_1^* \end{bmatrix}$$

After applying the reciprocal multiplication operation, the lightness and color post processor 1255 outputs the L*a*b* color space values to a second inverse color conversion process 1260.

The second inverse color conversion process 1260 functions the same way as the first inverse conversion process 1220, as illustrated by Eq. 5 to Eq. 8, although the perceptually uniform color space utilized by the second inverse color conversion process 1260 may be different, and the output native color space may be suitable for a later transcoder or a display and may be different than the native color space provided as input to the first color conversion process 1210. This image data is 1265 output to a display, or subsequent encoder, or image processing pipeline by way of non-limiting examples.

The present invention has several advantages over prior art methods of increasing perceptual quality and encoding efficiency of existing image and video compression systems.

Figure 13:
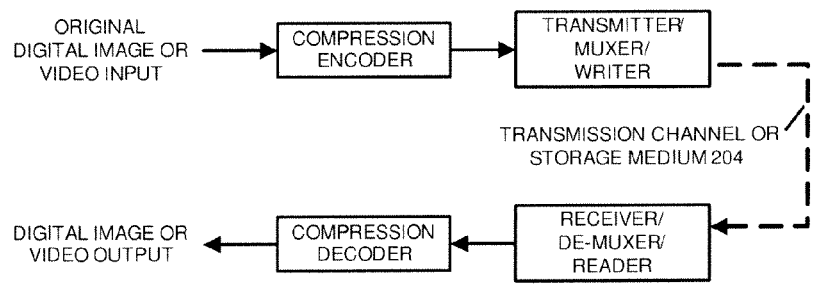
FIG. 13 is a block diagram of a video transmission system in the related art.

FIG. 13 illustrates a typical encoder and decoder chain, which suffers from inefficiencies due to the suboptimal choice of color space and symbol representation described previously.

Figure 14:
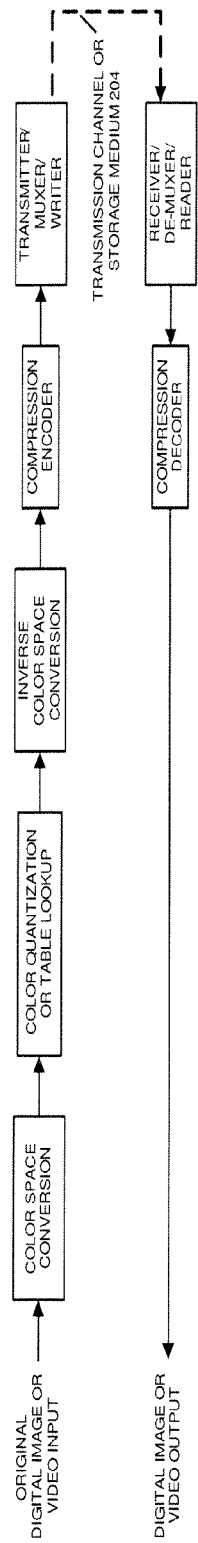
FIG. 14 is a block diagram of a video transmission system that reduces perceptual color entropy in the related art.

FIG. 14 illustrates a prior art attempt according to Guerrero to address the aforementioned inefficiencies. As shown in FIG. 14, an original digital image or video input is input to a color space conversion process. This color space conversion process converts from a native color space such as YCbCr color space or R'G'B' color space to a color space modeled after the HVS, such as CIE1931 XYZ color space, or CIELAB color space. Then, either a color lookup table, or an equidistant quantization formula is applied to each of the color channels of the color space. The lightness, luminance or Y channel is not treated. As a result, this process does not take advantages of the significant redundancies of the luminance or Y channel, and as is known to those skilled in the art, many contemporaneous video and image compression systems and methods direct more computational complexity and channel transmission bandwidth to the luminance channel compared to the chrominance channels, so it is especially important to eliminate redundancies therein.

Further, the process according to Guerrero assumes that performing equidistant quantization of the color channels for any color space modeled after the HVS is adequate; however, as was demonstrated by FIGS. 9, 10, and 11, and according to Poynton, CIE1931 XYZ color space has significant non-uniformity. CIE1931 XYZ color space is the most preferable of those disclosed in Guerrero, but while CIE1931 XYZ color space is based on a HSV model (as, indeed, all color spaces are), it is not perceptually uniform, so an equidistant quantization operation will create visible artifacts in the resulting images and video.

To address this, Guerrero discloses a color mapping function, which serves effectively as a color look-up table (hereinafter "LUT"). The disadvantages of this method, relative to embodiments of the present disclosure, are two-fold: first, there needs to be a separate LUT for each and every combination of native input color space and output HSV-perceptually-modeled color space which embodiments of the present disclosure do not impose; second, the usage of an LUT imposes a memory transfer bandwidth cost on the encoding system, whereby each pixel must have a read, a further indirect-reference memory read of the LUT and subsequent write operation performed upon it, for at least two color channels, which, again, embodiments of the present disclosure do not impose. If the LUT is replaced by a formula, Guerrero discloses color ranges that would require multiple polynomial solutions and compare/branch operations, which is not ideal when considering a solution of these need to be performed repeatedly for each and every pixel of a converted video stream.

By way of comparison, embodiments of the present disclosure only require a single value multiplication operation for each pixel of each channel of the converted image data.

Guerrero anticipates utilizing a perceptually uniform color space such as CIELAB color space instead of CIE1931 XYZ color space with the system and method disclosed therein. However, the foregoing disadvantages regarding color mapping function and/or LUT implementation apply. In the instance of the disclosed quantization function, the benefits of doing so are negated when utilized with any DCT-based encoding regime, in that the color entropy is simply replaced by spatial entropy, resulting in no net gain of coding-rate efficiency.

Figure 15:
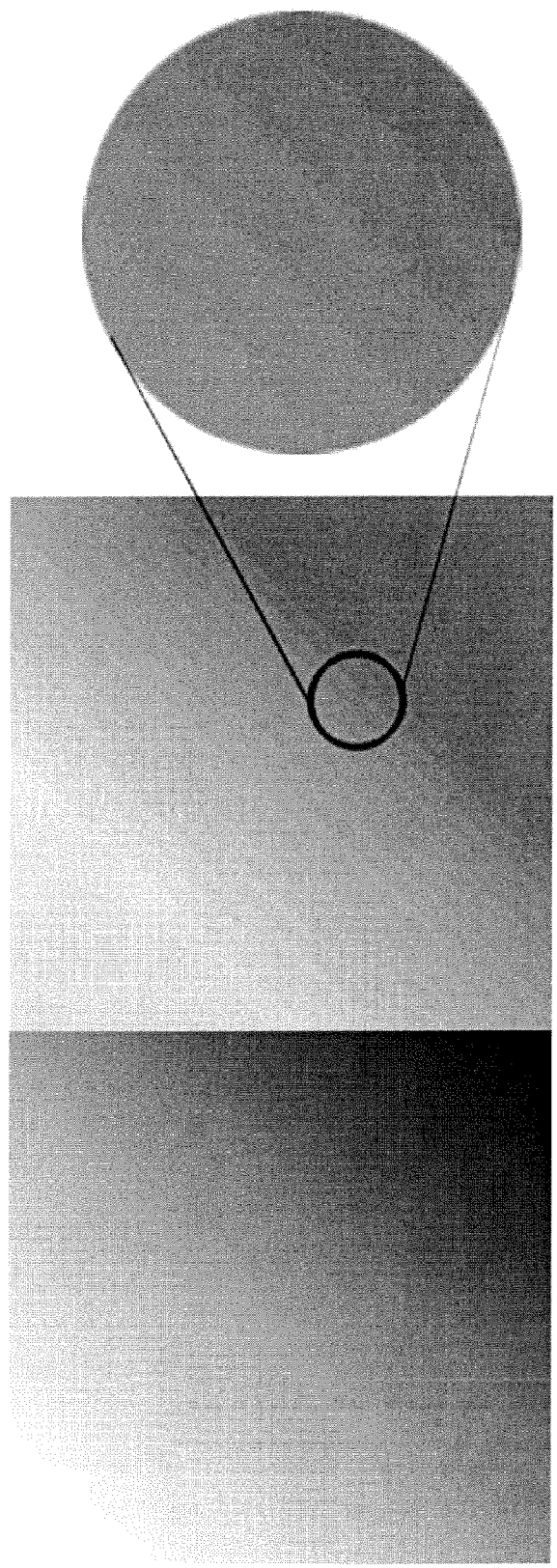
FIG. 15 shows the disadvantage of applying a quantization function on a color space to reduce color entropy, wherein color entropy is replaced with spatial entropy.

FIG. 15 illustrates this, wherein an original image patch containing a smooth 8-bit gradient is quantized to 4-bits. The color entropy has been reduced but the spatial entropy has increased because of the sharp boundaries of the newly-created boundary edges, plus the boundary condition error resulting in variegated spatial features which represent significantly increased spatial energy and entropy. In a DCT-based encoding regime, such as JPEG or any of the MPEG variants including HEVC, this results in extra entropy being expended in the DCT coefficients at the higher frequencies. This can be mitigated with a custom encoder that anticipates this, but embodiments of the present disclosure provide a system and method for increased quality and/or efficiency of encoding and decoding without requiring changes to, nor replacement of, the encoder and decoder implementations.

The spatial entropy problem illustrated previously can be mitigated by a proper use of a histogram function (such as that disclosed in the '384 patent) in the proximity of both the encoder and decoder to mitigate the unique features and problems of the process as disclosed by Guerrero when using the quantization function disclosed therein, but this problem is not recognized nor alluded to, and is taught away from in Guerrero. Embodiments of the present disclosure obviate the need for such processes.

The pre-encoding process of embodiments of the present disclosure is efficient enough to perform in greater-than-real-time for 4K video resolution video at 30 fps and near-real-time for 5K and 8K resolution video upon contemporaneous, commercial, mass-marketed computer hardware, and multiple images and video at a variety of resolutions in real-time and near-real-time. The post-encoding process of embodiments of the present disclosure is efficient enough to perform on any end-user device with a GPU, CPU, or APU at full HD resolutions for single instances of video and images, such as feature phones, smart phones, tablets, laptops, PCs, set-top boxes, and televisions.

This combination of efficiencies at both the encoder proximity and decoder proximity according to embodiments of the present disclosure opens up new applications. These applications include, but are not limited to, real-time improved video coder efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core.

Figure 16:
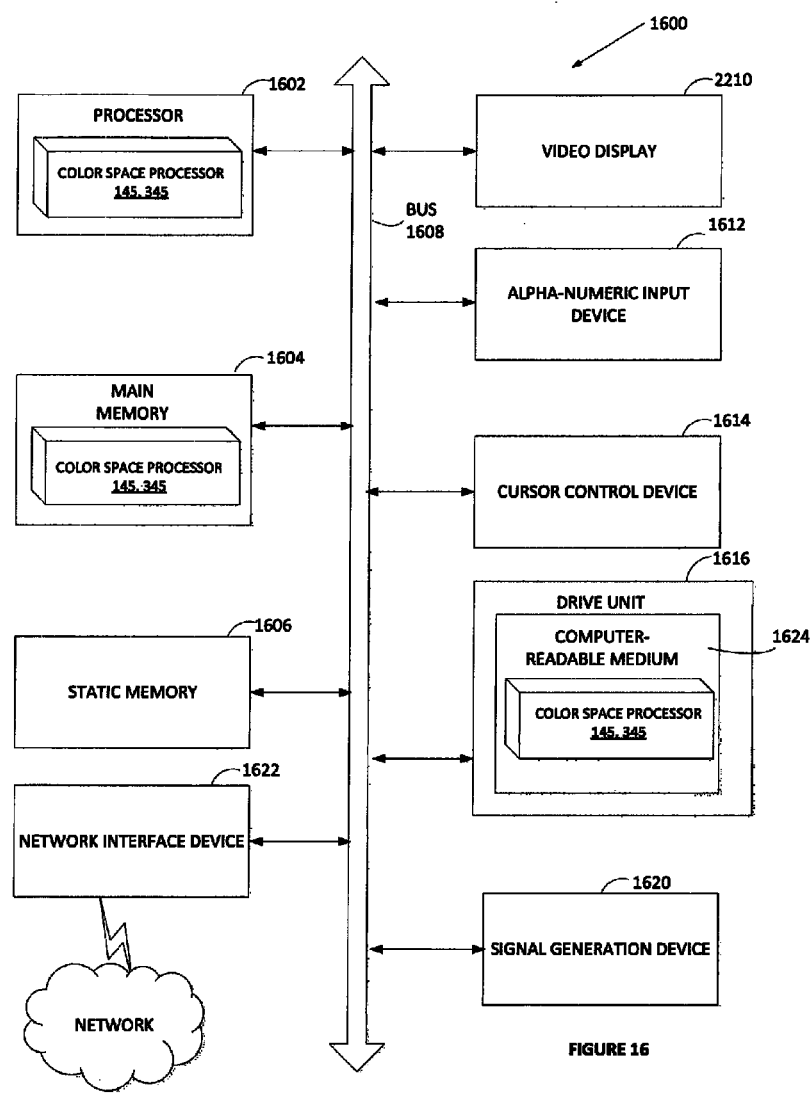
FIG. 16 illustrates a diagrammatic representation of a machine in the example form of a computer system within which a set of instructions, for causing the machine to perform any one or more of the methodologies discussed herein, may be executed.

FIG. 16 illustrates a diagrammatic representation of a machine in the example form of a computer system 1600 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1616, which communicate with each other via a bus 1608.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1602 may also be one or more special-purpose processing devices such as an application specific integrated circuit (ASIC), a field programmable gate array (FPGA), a digital signal processor (DSP), network processor, or the like. The color space processor 145, 345 shown in FIGS. 1 and 3, respectively, may be executed by processor 1602 configured to perform the operations and steps discussed herein.

The computer system 1600 may further include a network interface device 1622. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

A drive unit 1616 may include a computer-readable medium 1624 on which is stored one or more sets of instructions (e.g., instructions of the color space processor 145, 345) embodying any one or more of the methodologies or functions described herein. The instructions of the color space processor 145, 345 may also reside, completely or at least partially, within the main memory 1604 and/or within the processor 1602 during execution thereof by the computer system 1600, the main memory 1604 and the processor 1602 also constituting computer-readable media. The instructions of the color space processor 145, 345 may further be transmitted or received over a network via the network interface device 1622.

While the computer-readable storage medium 1624 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The high-throughput system and method as disclosed herein that improves the perceptual quality and/or the transmission or storage efficiency of existing image and video compression or transmission systems and methods solves problems in many fields, such as real-time efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core as but a few examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, at a first processing device, input image data comprising a plurality of pixels;
    first converting, using the first processing device, the plurality of pixels of the input image data from a native color space to a plurality of perceptually uniform color spaces on a pixel-by-pixel basis, wherein the plurality of perceptually uniform color spaces are color spaces wherein two colors of equal Cartesian distance in the color spaces are substantially equally distant perceptually with respect to the human visual system, and wherein converting comprises selecting the plurality of perceptually uniform color spaces employed for conversion of the plurality of pixels in view of evaluating a hue of each pixel of the input image data on a pixel-by-pixel basis and employing the evaluated hue to create first converted image data;
    multiplying, using the first processing device, a lightness channel of each pixel of the plurality of pixels of the first converted image data by a first value;
    second converting, using the first processing device, the plurality of pixels of the first converted image data from the plurality of perceptually uniform color spaces to the native color space on a pixel-by-pixel basis to produce second converted image data, wherein second converting comprises using the selection of the first conversion of the plurality of perceptually uniform color spaces employed for conversion of the plurality of pixels of the first converted image data to the second converted image data in view of the evaluated hue of each corresponding pixel of the input image data; and
    transmitting the second converted image data to a second processing device.

2. The method of claim 1, further comprising multiplying, using the first processing device, one or more pixels of one or more color opponent channels of the pixels of the first converted image data by a second value.

3. The method of claim 2, further comprising transmitting the second value to the second processing device.

4. The method of claim 2, further comprising transmitting the first value to the downstream second processing device.

5. The method of claim 2, further comprising receiving, at the second processing device, at least one of the first value or the second value from one of the first processing device, a memory buffer, a texture buffer, or an image buffer.

6. The method of claim 1, further comprising transmitting, by the first processing device, the second converted image data to an encoder, wherein the encoder is operable to encode the second converted image data.

7. The method of claim 1, further comprising:
    receiving, at the first processing device, one or more whitepoint values;
    first converting the plurality of pixels of the input image data from the native color space to the plurality of perceptually uniform color spaces on a pixel-by-pixel basis based on the one or more whitepoint values;
    second converting the plurality of pixels of the first converted image data from the plurality of perceptually uniform color spaces to the native color space on a pixel-by-pixel basis; and
    transmitting the one or more whitepoint values used for each perceptually uniform color space to the second processing device.

8. The method of claim 7, wherein one or more of the first value or the one or more whitepoint values are transmitted in-band with the second converted image data to the second processing device.

9. The method of claim 7, wherein one or more of the first value or the one or more whitepoint values are transmitted out-of-band with the second converted image data to the second processing device.

10. A system, comprising:
a memory of a first processing device to receive input image data comprising a plurality of pixels;
a color space processor of the first processing device, the color space processor coupled to and having use of the memory, the color space processor to:
first convert the plurality of pixels of the input image data from a native color space to a plurality of perceptually uniform color spaces on a pixel-by-pixel basis, wherein the plurality of perceptually uniform color spaces are color spaces wherein two colors of equal Cartesian distance in the color spaces are substantially equally distant perceptually with respect to the human visual system, and wherein converting comprises selecting the plurality of perceptually uniform color spaces employed for conversion of the plurality of pixels in view of evaluating a hue of each pixel of the input image data on a pixel-by-pixel basis and employing the evaluated hue to create first converted image data;
multiply a lightness channel of each pixel of the plurality of pixels of the first converted image data by a first value;
second convert the plurality of pixels of the first converted image data from the plurality of perceptually uniform color spaces to the native color space on a pixel-by-pixel basis to produce second converted image data, wherein second converting comprises using the selection of the first conversion of the plurality of perceptually uniform color spaces employed for conversion of the plurality of pixels of the first converted image data to the second converted image data in view of the evaluated hue of each corresponding pixel of the input image data; and
transmit the second converted image data to a second processing device.

11. The system of claim 10, wherein the color space processor is implemented as one of a microprocessor, a microcontroller, a graphics processing unit, a digital signal processor, a field programmable gate array, or an application specific integrated circuit.

12. A method, comprising:
receiving, at a first processing device from a second processing device, input image data comprising a plurality of pixels and a first value;
first converting, using the first processing device, the plurality of pixels of the input image data from a native color space to a plurality of perceptually uniform color spaces on a pixel-by-pixel basis, wherein the plurality of perceptually uniform color spaces are color spaces wherein two colors of equal Cartesian distance in the color spaces are substantially equally distant perceptually with respect to the human visual system, wherein first converting comprises selecting the plurality of perceptually uniform color spaces employed for conversion of the plurality of pixels in view of evaluating a hue of each pixel of the input image data on a pixel-by-pixel basis and employing the evaluated hue to create first converted image data;
multiplying, using the first processing device, a lightness channel of each pixel of the plurality of pixels of the first converted image data buffer by a reciprocal of the first value;
second converting, using the first processing device, the plurality of pixels of the first converted image data buffer from the plurality of perceptually uniform color spaces to the native color space on a pixel-by-pixel basis to produce second converted image data, wherein second converting comprises using the selection of the first conversion of the plurality of perceptually uniform color spaces employed for conversion of the plurality of pixels of the first converted image data to the second converted image data in view of the evaluated hue of each corresponding pixel of the input image data; and
transmitting, using the first processing device, the second converted image data to a third processing device.

13. The method of claim 12, further comprising:
receiving, at the first processing device from the second processing device, a second value and
multiplying, using the first processing device, one or more color opponent channels of the one or more pixels of the first converted image data by a reciprocal of the second value.

14. The method of claim 13, further comprising:
receiving, at the first processing device from the second processing device, one or more whitepoint values and
converting, using the first processing device, the plurality of pixels of the first converted image data from the plurality of perceptually uniform color spaces to the native color space on a pixel-by-pixel basis based on the one or more whitepoint values.

15. The method of claim 14, wherein the first value, the second value, and the one or more whitepoint values are received in-band with the input image data from the second processing device.

16. The method of claim 14, wherein the first value, the second value, and the one or more whitepoint values are received out-of-band with the input image data from the second processing device.

17. The method of claim 12, wherein the at least one native color space associated with the first processing device differs from at least one native color space associated with the second processing device.

18. The method of claim 12, wherein the plurality of perceptually uniform color spaces associated with the first processing device differ from the plurality of perceptually uniform color spaces associated with the second processing device.

19. The method of claim 12, wherein the third processing device is one or more of a display, an encoder, or an image processing pipeline.

20. A system, comprising:
a memory of a first processing device to receive input image data comprising a plurality of pixels and a first value from a second processing device;
a color space processor of the first processing device, the color space processor coupled to and having use of the memory, the color space processor to:
first convert the plurality of pixels of the input image data from a native color space to a plurality of perceptually uniform color spaces on a pixel-by-pixel basis, wherein the plurality of perceptually uniform color spaces are color spaces wherein two colors of equal Cartesian distance in the color spaces are substantially equally distant perceptually with respect to the human visual system, wherein first converting comprises selecting the plurality of perceptually uniform color spaces employed for conversion of the plurality of pixels in view of evaluating a hue of each pixel of the input image data on a pixel-by-pixel basis and employing the evaluated hue to create first converted image data;
multiply a lightness channel of each pixel of the plurality of pixels of the first converted image data buffer by a reciprocal of the first value;
second convert the plurality of pixels of the first converted image data buffer from the plurality of perceptually uniform color spaces to the native color space on a pixelby-pixel basis to produce second converted image data, wherein second converting comprises using the selection of the first conversion of the plurality of perceptually uniform color spaces employed for conversion of the plurality of pixels of the first converted image data to the second converted image in view of the evaluated hue of each corresponding pixel of the input image data; and transmit the second converted image data to a third processing device.

21. The system of claim 20, wherein the color space processor is implemented as one of a microprocessor, a microcontroller, a graphics processing unit, a digital signal processor, a field programmable gate array, or an application specific integrated circuit.

22. The method of claim 20, wherein the third processing device is one or more of a display, an encoder, or an image processing pipeline.

\* \* \* \* \*